US008567677B1

(12) United States Patent
Yap et al.

(10) Patent No.: US 8,567,677 B1
(45) Date of Patent: Oct. 29, 2013

(54) OPTICAL IDENTIFICATION SYSTEM AND METHOD

(75) Inventors: Daniel Yap, Newsbury Park, CA (US); Keyvan R. Sayyah, Santa Monica, CA (US); Dennis C Jones, Malibu, CA (US)

(73) Assignee: HRL Laboratories, LLC, Malibu, CA (US)

( * ) Notice: Subject to any disclaimer, the term of this patent is extended or adjusted under 35 U.S.C. 154(b) by 571 days.

(21) Appl. No.: 11/932,228

(22) Filed: Oct. 31, 2007

Related U.S. Application Data

(60) Provisional application No. 60/865,608, filed on Nov. 13, 2006.

(51) Int. Cl.
*G06K 7/10* (2006.01)
*G06K 19/06* (2006.01)

(52) U.S. Cl.
USPC .......................................... 235/454; 235/494

(58) Field of Classification Search
USPC .............................. 235/454, 462.01, 487, 494
See application file for complete search history.

(56) References Cited

U.S. PATENT DOCUMENTS

| | | | | |
|---|---|---|---|---|
| 3,835,297 A | * | 9/1974 | Inoue et al. | 235/469 |
| 4,834,511 A | | 5/1989 | Bennion | |
| 4,927,180 A | * | 5/1990 | Trundle et al. | 283/70 |
| 5,472,759 A | * | 12/1995 | Chen et al. | 428/65.1 |
| 5,618,654 A | | 4/1997 | Takei | |
| 5,629,512 A | * | 5/1997 | Haga | 235/468 |
| 5,956,172 A | * | 9/1999 | Downing | 359/326 |
| 6,296,189 B1 | * | 10/2001 | Lawandy et al. | 235/491 |
| 6,366,388 B1 | | 4/2002 | Hampp | |
| 6,556,273 B1 | * | 4/2003 | Wheeler et al. | 352/92 |
| 2006/0219791 A1 | * | 10/2006 | Mossberg et al. | 235/454 |
| 2006/0255243 A1 | * | 11/2006 | Kobayashi et al. | 250/208.1 |
| 2008/0296381 A1 | * | 12/2008 | Yu et al. | 235/462.01 |

OTHER PUBLICATIONS

S.D. Hart, G.R. Maskaly, B. Temelkuran, P.H. Prideaux, J.D. Joannopoulos and Y. Fink, "External Reflection from Omnidirectional Dielectric Mirror Fibers," Science, v. 296 (Apr. 19, 2002), pp. 510-513.
G. Benoit, K. Kuriki, J. F. Viens, J. D. Joannoppulos and Y. Fink, "Dynamic All-optical Tuning of Transverse Resonant Cavity Modes in Photonic Bandgap Fibers," Optics Letters, v. 30, n. 13 (2005), pp. 1620-1622.
K. Lee Lerner and Brenda Wilmoth Lerner, Gale Encyclopedia of Science, vol. 6, 4th Edition, 2008, p. 1759, Fluorescence.
K. Lee Lerner and Brenda Wilmoth Lerner, Gale Encyclopedia of Science, vol. 6, 4th Edition, 2008, p. 462, Bar Code.

* cited by examiner

*Primary Examiner* — Daniel Hess
(74) *Attorney, Agent, or Firm* — Daniel R. Allemeier; George R. Rapacki

(57) ABSTRACT

The invention is an optical labeling/identification system that comprises an optical interrogator, optical label and a programmer. The optical label stores and returns to the interrogator different parts of a wavelength code word. The programmer programs the optical labels with a programming light beam to change the wavelength response of the labels. Interrogation and programming of the labels can be accomplished from a stand off distance without physical contact between the label and the interrogator/programmer. The label may be applied to uneven, wrinkled or discontinuous surfaces.

17 Claims, 19 Drawing Sheets

(Prior Art)

Open Ring 31          Closed Ring 33

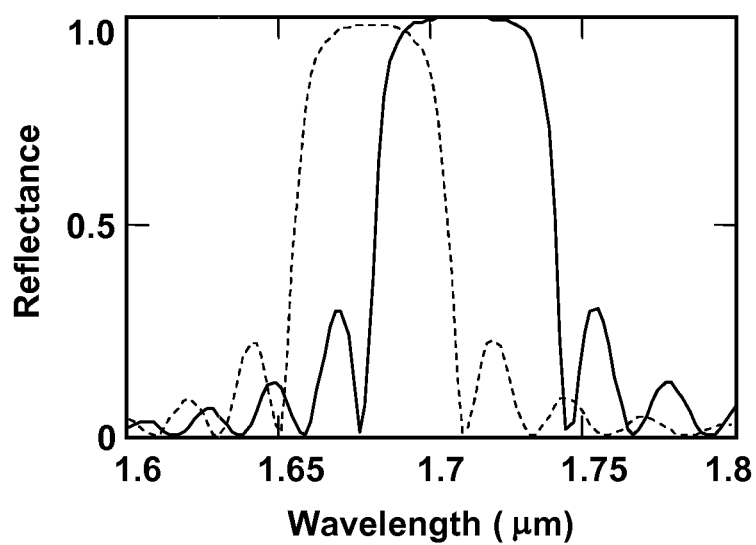
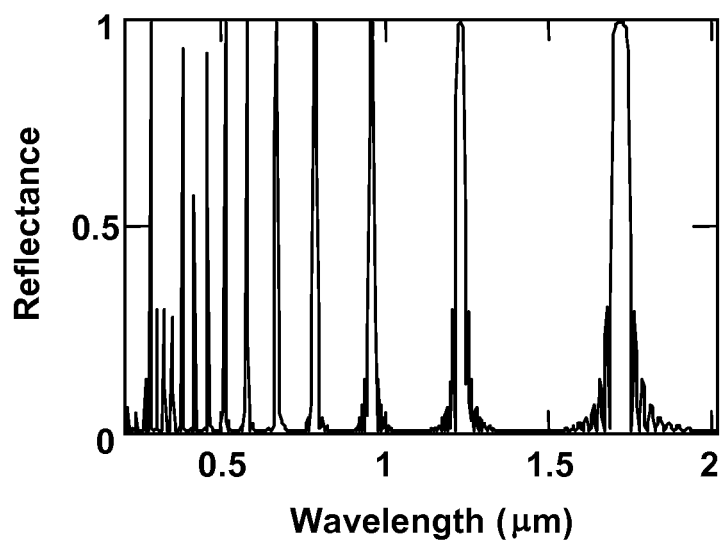
FIG. 8

OPTICAL IDENTIFICATION SYSTEM AND METHOD

CROSS-REFERENCE

This application claims priority to provisional application 60/865,608 filed 13 Nov. 2006 titled Optical Identification System and Method This application is related to U.S. Application No. 60/865,619, titled "Programmable Optical Label," filed on Nov. 13, 2006, which is incorporated herein by reference in its entirety.

STATEMENT OF FEDERALLY SPONSORED RESEARCH

None

NAME OF PARTIES TO JOINT RESEARCH AGREEMENT

None

BACKGROUND

This invention relates to the field of labeling and identifying objects with an optical label and a corresponding optical identification system.

Photochromic material was used in optical modulator wherein the spatial modulation pattern can be controlled by the intensity pattern of a control light illuminating the modulator. See, U.S. Pat. No. 4,834,511 and U.S. Pat. No. 5,618,654. The photochromic material is incorporated in an etalon type optical cavity. Illumination of the photochromic material by the control light results in a change in the refractive index of the photochromic material. This change in refractive index presumably changes the optical properties of the etalon. The state of the etalon can remain fixed when the programming light is not present. These patents describe transmissive light modulating structures since the etalon produces a peak in the transmission spectrum. Further, the optical etalon can be tuned to a particular wavelength of programming light.

Furthermore, these prior inventions do not provide for a means to selectively and separately encode the modulation response to multiple wavelengths of incident light or a means to select among multiple wavelengths of programming light.

Photochromic layer was incorporated in an optical spatial light modulator. The spatial light modulator makes use of the change in absorption of the photochromic material at the wavelength of a signal light. See, U.S. Pat. No. 6,366,388, herein incorporated by reference. The modulator also contains an optical reflecting filter that selectively reflects the programming light so that the programming light makes two passes through a layer of photochromic material. This reflecting filter for the programming light is located on the side of the photochromic film that is facing away from the direction of the incident programming and signal light.

It is known that optical fiber having a cylindrical shape can be designed to reflect a specific wavelength of light that is incident upon the sides of the fiber. See, S. D. Hart, G. R. Maskaly, B. Temelkuran, P. H. Prideaux, J. D. Joannopoulos and Y. Fink, "External Reflection from Omnidirectional Dielectric Mirror Fibers," Science, v. 296 (19 Apr. 2002), pp. 510-513; and G. Benoit, K. Kuriki, J. F. Viens, J. D. Joannopoulos and Y. Fink, "Dynamic All-optical Tuning of Transverse Resonant Cavity Modes in Photonic Bandgap Fibers," Optics Letters, v. 30, n. 13 (2005), pp. 1620-1622, herein incorporated by reference.

The first paper, by Hart, et al., also describes the incorporation of such fiber into a woven fabric. The second paper, Benoit et al., also describes tuning the reflection wavelength by simultaneously applying a light of a visible wavelength to the fiber. This visible wavelength light temporarily changes the wavelength of the optical absorption edge of the chalcogenide material in the fiber in a process known as transient photodarkening. The material that undergoes the transient photodarkening is incorporated in a wavelength selective optical reflecting structure. The accompanying change in the reflection that is due to transient photodarkening persists only while the visible wavelength light is applied on the fiber. To obtain a reversible response, this prior art operates in the transient photodarkening regime which is not associated with a memory effect. Thus, this wavelength selective fiber requires continuous application of a programming light to retain a particular programmed state.

Although it is known that the chalcogenide materials also have a metastable photodarkened state (which might possibly provide a memory effect, although not discussed in the prior art) the approach of Benoit, et al. avoids operation in that regime since the metastable photodarkened condition is not reversible at room temperature. This prior art also does not describe selective and changeable reflection of multiple wavelengths. It also does not provide for a way to select among multiple programming wavelengths.

For the foregoing reasons, there is a need for a programmable wavelength coded optical labeling or identification system wherein the optical label comprises a photochromic material in a multi-layer reflective stack whereby the stack functions as a filter having a reflection peak, not a transmission peak. There is also a need for an optical labeling system wherein the optical label can select among multiple wavelengths of programming and interrogation light. Furthermore, there is a need for an optical labeling system wherein the optical label has a memory function reprogrammable at room temperature at a substantially large standoff distance without making physical contact, wherein the memory does not require sustaining power to maintain the programmed state. There is yet another need for an optical labeling system wherein the coded region may be wrinkled, discontinuous, or folded.

SUMMARY

The present invention generally provides for an optical labeling/identification system.

In one aspect, the present invention provides an optical identification system, the system comprising: an optical interrogator for interrogating an optical label affixed to items by an interrogating light beam and a programmer for programming the optical label by a programming light beam. The optical label comprises a plurality of retro-reflecting constructs, each of the constructs comprising a retro-reflecting optical member and a multi-part programmable reflecting structure, whereby the optical label is programmed by the programming light beam to retro-reflect a selected combination of wavelengths of the interrogating light beam.

In another aspect, the present invention provides a method of identifying items comprising the steps of: providing an optical interrogator for interrogating an optical label affixed to items by an interrogating light beam and providing a programmer for programming the optical label by a programming light beam. The optical label comprises a plurality of retro-reflecting constructs, each of the constructs comprising a retro-reflecting optical member and a multi-part programmable reflecting structure, whereby the optical label is programmed by the programming light beam to retro-reflect a selected combination of wavelengths of the interrogating light beam.

Some objects and advantages of the present are:

The present invention presents an identification system that is immune to RF interference; objects with flexible, discontinuous or uneven surface can be labeled and identified; objects can be programmed and identified from a large standoff distances; spot size of the interrogating light beam can be comparable in size to the coded surfaced of an object or even larger than the coded region; the coded response of an optical label of the present invention may be changed from a stand off distance; the optical label can retain its programmed state for a relatively long time without any sustaining power.

DESCRIPTION OF THE DRAWINGS

The present invention will be understood and appreciated more fully from the following detailed description taken in conjunction with the drawings described below.

Programmable Optical Label

FIG. 8 shows the reflection spectra of an exemplary embodiment of a programmable reflection filter.

Optical Identification System and Method

Figure 1:
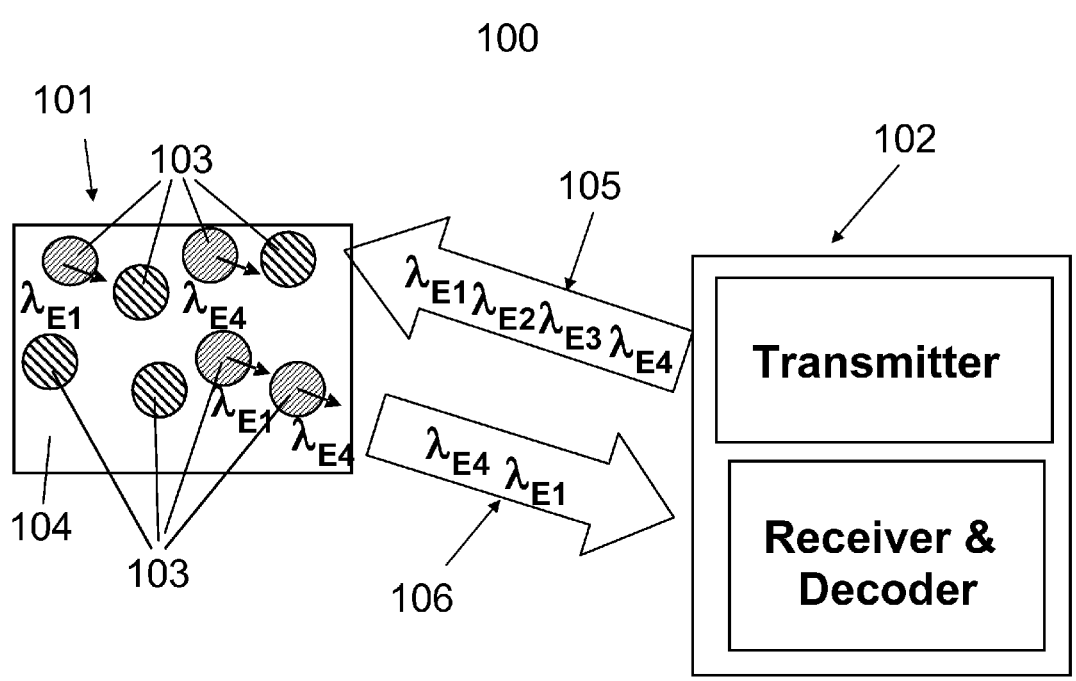
FIG. 1 is an exemplary embodiment of a programmed optical identification system.

FIG. 1 is an exemplary embodiment of the present invention as a schematic diagram of an optical labeling/identification system.

Figure 19:
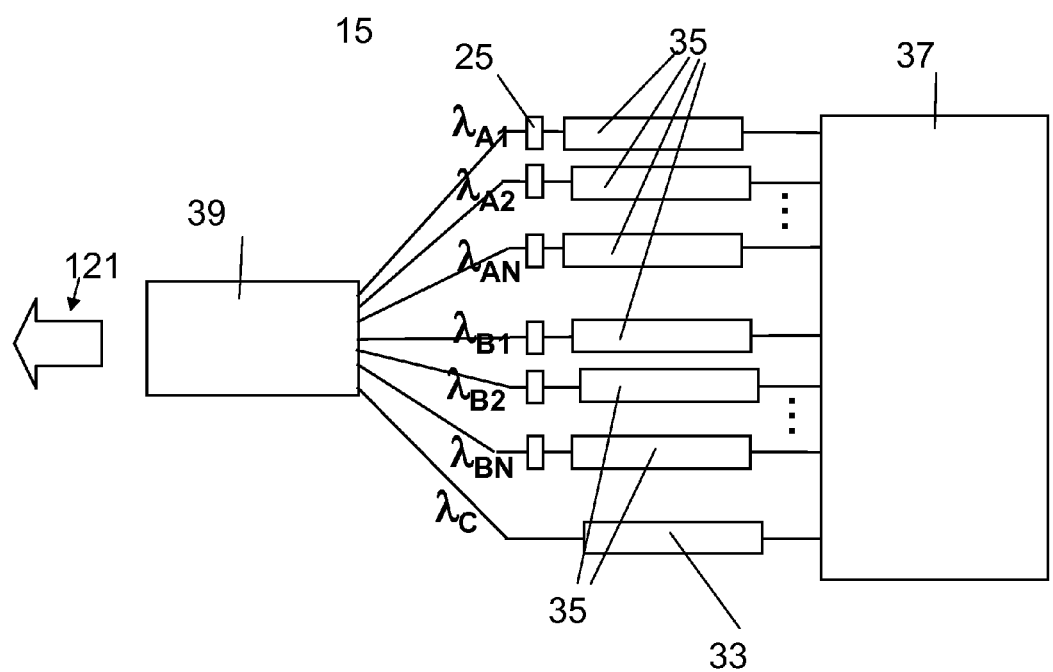

FIG. 19 shows a block diagram of an exemplary embodiment of an optical programmer.

Figure 20:
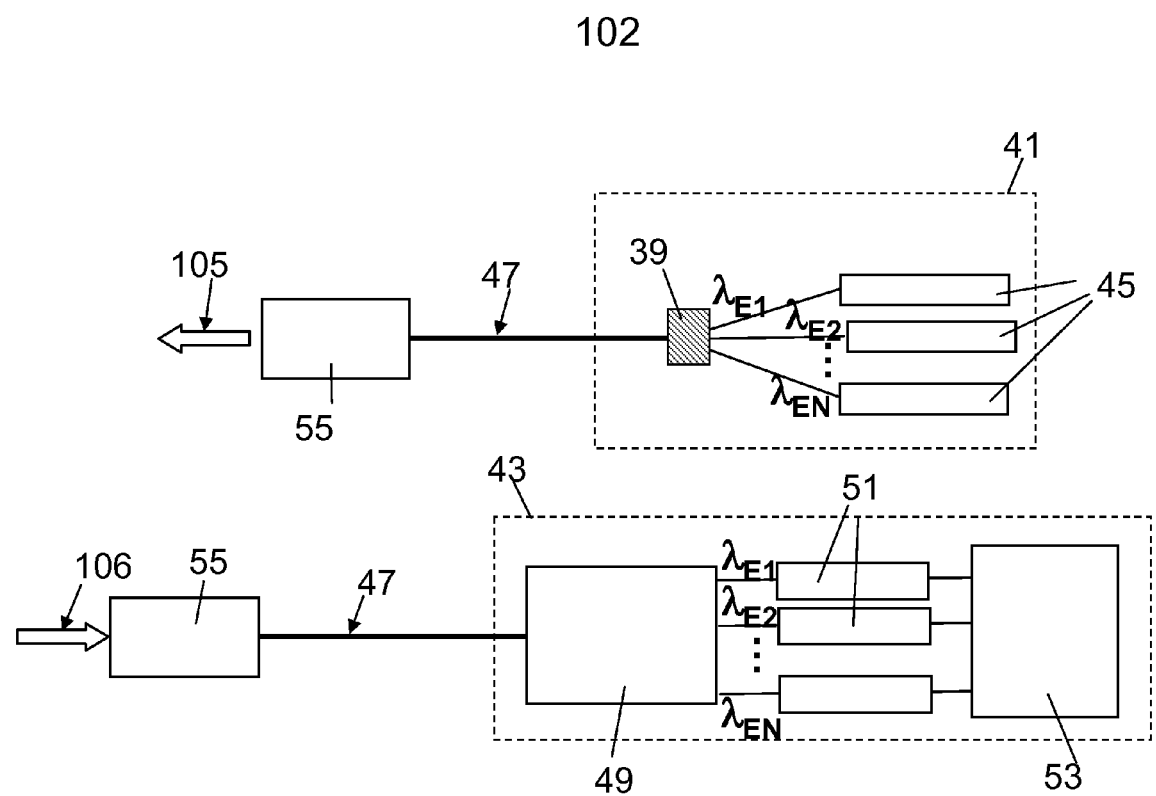

FIG. 20 shows a block diagram of an exemplary embodiment of an optical interrogator.

DESCRIPTION

The present invention will now be described more fully hereinafter with reference to the accompanying drawings, in which preferred embodiments of the invention are shown. This invention may be embodied in many different forms and should not be construed as limited to the embodiments set forth herein. Further, the dimensions of layers and other elements shown in the accompanying drawings may be exaggerated to more clearly show details. The present invention should not be construed as being limited to the dimensional relations shown in the drawings, nor should the individual elements shown in the drawings be construed to be limited to the dimensions shown.

PROGRAMMABLE OPTICAL LABEL DESCRIPTION

In general, the present invention is a programmable and latching retro-reflective construct suitable for use as an optical label in an optical labeling system. The retro-reflective construct comprises a photochromic material responsive to specific wavelengths of light.

FIG. 1 depicts an optical labeling system 100 comprising a programmable optical label 101 and an optical interrogator 102. The programmable optical label 101 comprises a plurality of retro-reflecting constructs 103 disposed on a labeled surface 104. The surface 104 may be an uneven or discontinuous surface; as such the surface could not easily be labeled with labels such as a bar code that contains spatial patterns of high reflectivity and low reflectivity regions.

In one embodiment, the labeled surface 104 is highly corrugated with small and discontinuous features similar to the surface of an automobile radiator or a window screen. In another example, the labeled surface 104 is like a crumpled piece of paper that has many folds therein. In yet another example, the surface 104 is like a piece of sheep skin with wool thereon. In another example, the surface 104 is in the form of a woven or knitted fabric.

Referring back to FIG. 1, in an exemplary embodiment the optical label 101 can take the form of a fabric label. The fabric label can contain a collection of narrow label strips that comprise yarns incorporated into the fabric, wherein the yarns comprise the reflecting construct 103. This collection may comprise several different kinds of strips. Each kind of strip may be associated with a different wavelength of the interrogating light beam 105. Each kind of strip may also be programmed by a different set of programming wavelengths. There generally would be at least as many differing kinds of strips in the fabric as there are different wavelengths in the code used for the labeling system.

The optical label 101 comprises a plurality of retro-reflecting constructs 103 that can be programmed to provide specific wavelength coded responses when illuminated with multi-wavelength interrogation light 105. For example, the coded responses may identify the labeled surface 104 as "radiator", "paper", "sheep skin" or "garment". The optical interrogator 102 illuminates the surface 104 with the interrogation light 105 comprising multiple wavelengths of light such as $\lambda 1$, $\lambda 2$, $\lambda 3$, $\lambda 4$. Each of the plurality of retro-reflecting constructs 103 on the labeled surface 104 can retro-reflect a specific wavelength of light according to its programmed state, whereby the constructs 103 on the surface 104 retro-reflect a light with specific combination of wavelengths 106 according to the wavelength-code programmed into each construct 103.

Figure 2:
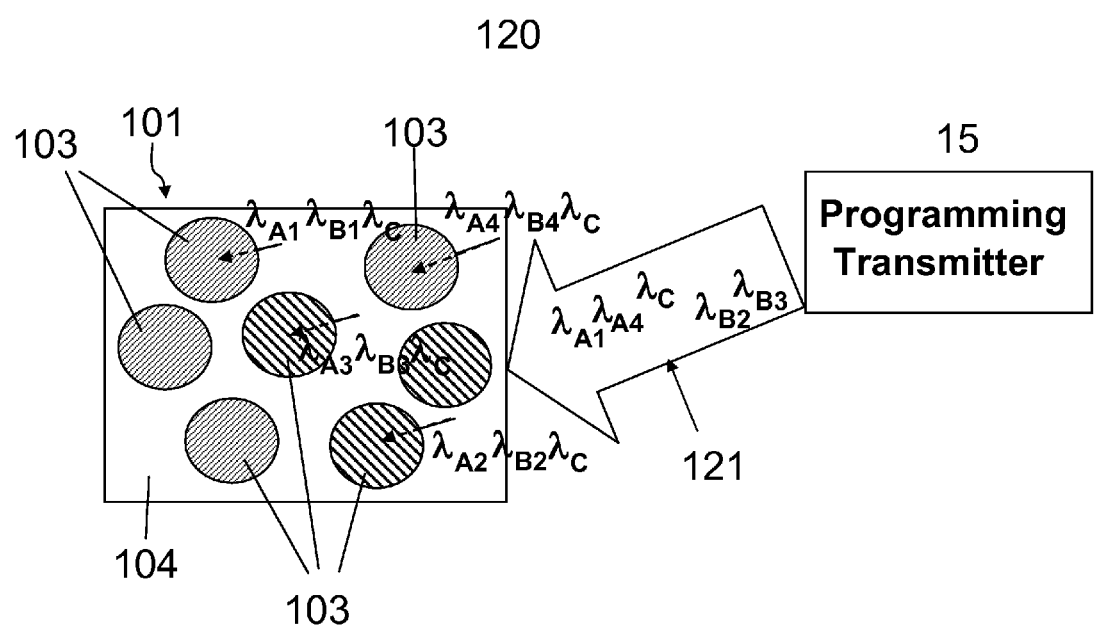
FIG. 2 illustrates an exemplary programming process of the programmable optical label.

FIG. 2 illustrates an exemplary programming and coding process 120. The plurality of retro-reflecting constructs 103 can be programmed and reprogrammed with various wavelength codes. A programming light beam 121 illuminates the retro-reflecting constructs 103. The light beam 121 comprises a specific combination of wavelengths of light. In this embodiment of the invention, the wavelengths are $\lambda A1$ or $\lambda B1$, $\lambda A2$ or $\lambda B2$, $\lambda A3$ or $\lambda B3$, $\lambda A4$ or $\lambda B4$, and optionally $\lambda C$ where $\lambda C$ is a conditioning wavelength that enables the programming. These wavelengths can change the state of the photochromic materials in the retro-reflecting constructs 103. After the programming light 121 is removed, the photochromic materials retain their programmed states. Those states can then be sensed by a beam of the interrogation light 105 shown in FIG. 1. Each retro-reflecting construct may be programmed differently by the programming light. Some retro-reflecting constructs 103 may be programmed to be reflecting and other constructs 103 may be programmed to be non-reflecting. Since each construct 103 may be associated with different wavelengths of the interrogation light 105, a specific wavelength code can be programmed into the retro-reflection constructs 103 labeling an object.

The optical label 101 comprises a plurality of retro-reflecting constructs 103 that can be programmed to provide specific wavelength coded responses when illuminated with multi-wavelength interrogation light 105. For example, the coded responses may identify the labeled surface 104 as "radiator", "paper", "sheep skin" or "garment". The optical interrogator 102 illuminates the surface 104 with the interrogation light 105 comprising multiple wavelengths of light such as $\lambda E1$, $\lambda E2$, $\lambda E3$, $\lambda E4$. Each of the plurality of retro-reflecting constructs 103 on the labeled surface 104 can retro-reflect a specific wavelength of light according to its programmed state, whereby the constructs 103 on the surface 104 retro-reflect a light with specific combination of wavelengths 106 according to the wavelength-code programmed into each construct 103.

FIG. 2 illustrates an exemplary programming and coding process 120. The plurality of retro-reflecting constructs 103 can be programmed and reprogrammed with various wavelength codes. A programming light beam 121 from a programming transmitter 15 illuminates the retro-reflecting constructs 103. The light beam 121 comprises a specific combination of wavelengths of light. As shown in FIG. 2, the programming wavelengths are $\lambda A1$ or $\lambda B1$, $\lambda A2$ or $\lambda B2$, $\lambda A3$ or $\lambda B3$, $\lambda A4$ or $\lambda B4$, and optionally $\lambda C$ where $\lambda C$ is a conditioning wavelength that enables the programming. These wavelengths can change the state of the photochromic materials in the retro-reflecting constructs 103. After the programming light 121 is removed, the photochromic materials retain their programmed states. Those states can then be sensed by a beam of the interrogation light 105 shown in FIG. 1. Each retro-reflecting construct may be programmed differently by the programming light. Some retro-reflecting constructs 103 may be programmed to be reflecting and other constructs 103 may be programmed to be non-reflecting. Since each construct 103 may be associated with different wavelengths of the interrogation light 105, a specific wavelength code can be programmed into the retro-reflection constructs 103 labeling an object.

Figure 3A:
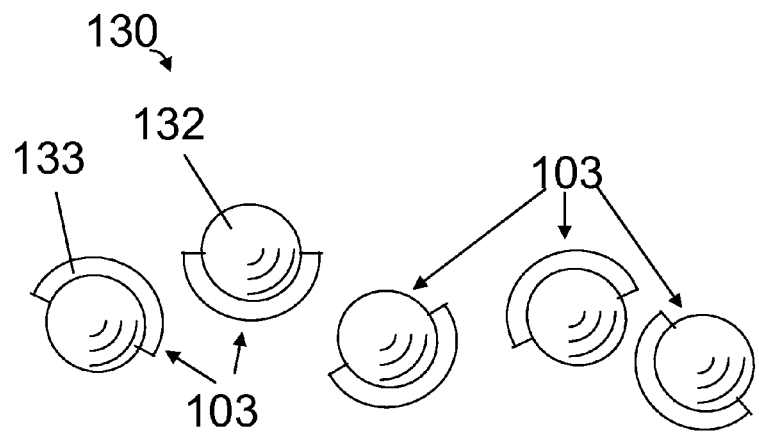
FIGS. 3a and 3b are exemplary embodiments of the programmable optical label.
Figure 3B:
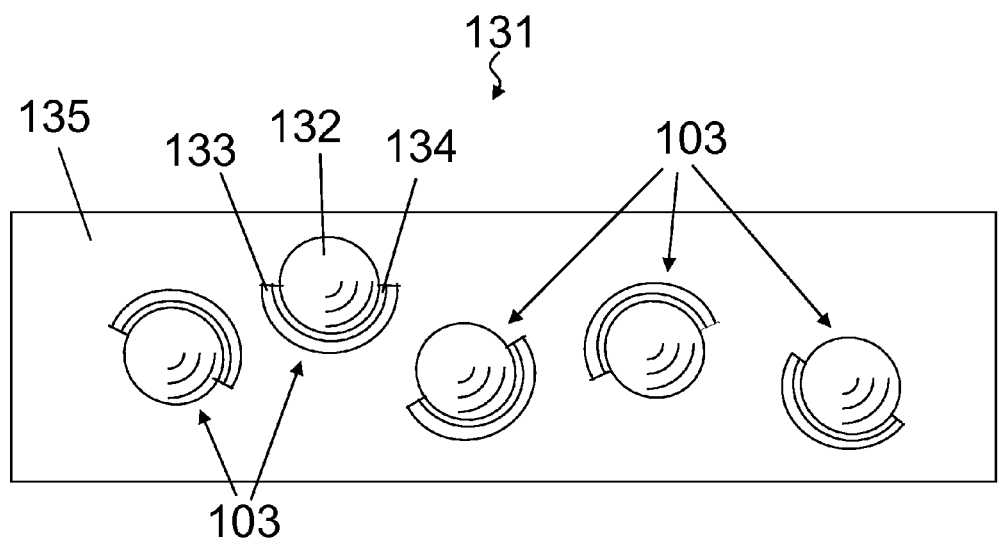

FIGS. 3a and 3b present two exemplary embodiments 130, 131 of the invention. FIG. 3a illustrates a plurality of retro-reflecting constructs 103 applied as a dry aerosol onto a surface. FIG. 3b illustrates the constructs 103 immersed in a film 135, such as an adhesive coating.

A preferred embodiment of the retro-reflecting constructs 103 shown in FIG. 3a comprises a spherical lens 132 such as lens bead and a programmable reflecting coating 133. The lens 132 has a refractive index that allows it to function as a lens. The typical values for the refractive index may range from 1.8 to 2.8. See U.S. Pat. No. 2,963,378, herein incorporated by reference. The programmable reflecting coating 133 coats a portion of the lens 132. The coating 133 comprises photochromic material responsive to specific wavelengths of light. Another portion of the lens 132 is not coated with the reflecting coating 133.

For the embodiment shown in FIG. 3b, a spacer layer 134 is disposed between the spherical lens 132 and the programmable reflecting coating 133. The thickness of the spacer layer 134 is chosen to establish the reflecting coating 133 at the focal plane of the spherical lens 132 which is immersed in a film 135. The spacer layer 134 is not included in the embodiment shown in FIG. 3a since those label pieces will have their clear surfaces (that are not coated with the reflecting coating 133) exposed to air.

Figure 4:
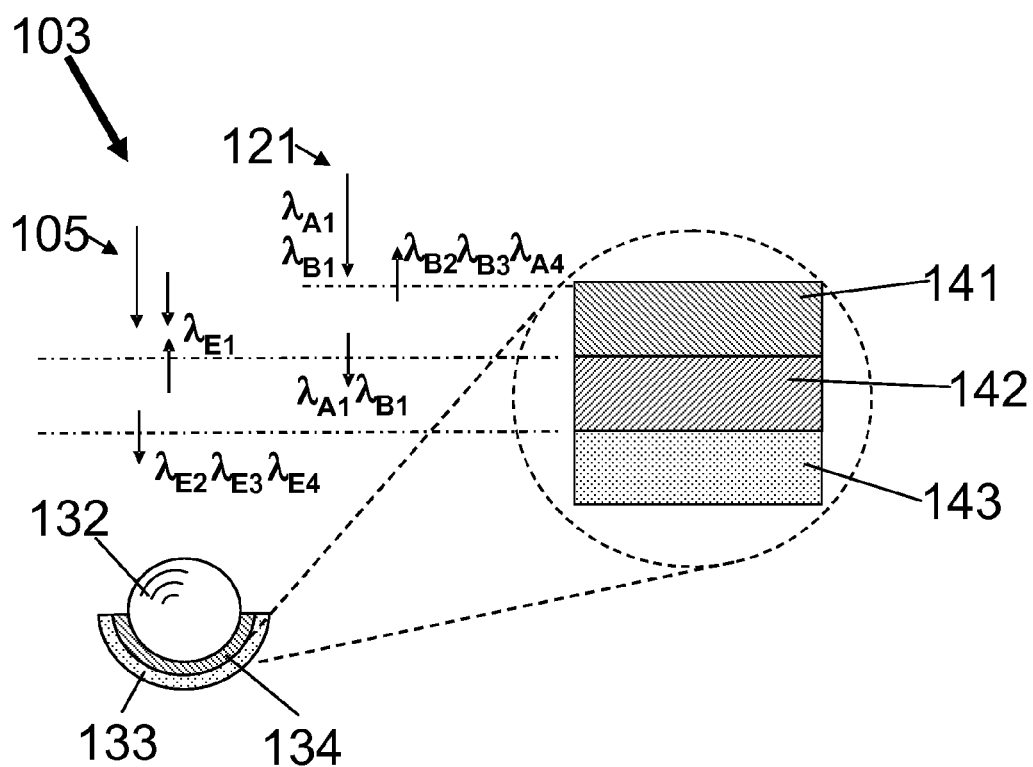
FIG. 4 is an expended view of the construction of an embodiment of a retro-reflecting construct.

FIG. 4 presents an embodiment of the retro-reflecting construct 103 in expanded detail. One function of the reflecting construct 103 as shown in FIG. 4 is to select those programming wavelengths that will determine the state of the photochromic material in the reflecting construct 103. The programmable reflecting coating 133 preferably comprises a multi-peak transmission filter layer 141, a programmable wavelength selective reflection layer 142 and a black absorber layer 143. The transmission filter layer 141 is disposed closest to the surface of the spherical lens 132. The multi-peak transmission filter layer 141 selects specific wavelengths of light to program the photochromic material contained in the selective reflection layer 142.

In FIG. 4, the transmission filter 141 passes one specific programming light beam 121 wavelength (e.g., $\lambda A1$) in the band between 250 and 340 nm and one specific programming light beam 121 wavelength (e.g., $\lambda B1$) in the band between 460 and 680 nm. In an exemplary embodiment comprising the photochromic material of FIG. 6, the multi-peak transmission filter 141 in FIG. 4 reflects other programming wavelengths (e.g., $\lambda A2$, $\lambda A3$, $\lambda B2$, $\lambda B3$) in those two bands and thereby keeps the light at those other programming wavelengths from affecting the state of the photochromic material in the reflecting construct 103. Note that the multi-peak transmission filter 141 also transmits the full range of interrogating light beam 105 wavelengths and a conditioning wavelength $\lambda C$ (if such a conditioning wavelength also is used).

The programmable wavelength selective reflection layer 142 comprises preferably multiple layers of photochromic material and non-photochromic material. Furthermore, the reflection layer 142 preferably comprises alternating layers of the photochromic material and the non-photochromic material whereby an optical multi-layer interference filter is formed. The programmable wavelength selective reflection layer 142 reflects a specific wavelength of interrogation light 105 associated with a given retro-reflecting construct 103. The wavelength selective reflection layer 142 reflects the interrogation light 105 with an associated wavelength when the photochromic material is so programmed. However, when the photochromic material is programmed into another state, the programmable wavelength reflection layer 142 transmits that interrogation wavelength (as well as all of the other interrogation wavelengths) instead of reflecting it back toward the spherical lens 132. The black absorber layer 143 absorbs, with minimal reflection, all the wavelengths of light reaching it.

To label an object, a plurality of retro-reflecting constructs 103, preferably comprising several different kinds of the constructs 103, are affixed to a labeled surface. Each kind of the constructs 103 is associated with a different wavelength of the interrogation light 105 (e.g., one of λE1, λE2, λE3 or λE4). Each kind of constructs 103 also is programmed with a different set of programming wavelengths (e.g., a pair comprising λA1 and λB1, λA2 and λB2, λA3 and λB3, or λA4 and λB4). While the example given identifies four pairs of wavelengths, there preferably would be at least as many kinds of retro-reflecting constructs 103 on the surface of a labeled object as there are different wavelengths in the code used for labeling the object.

Figure 5:
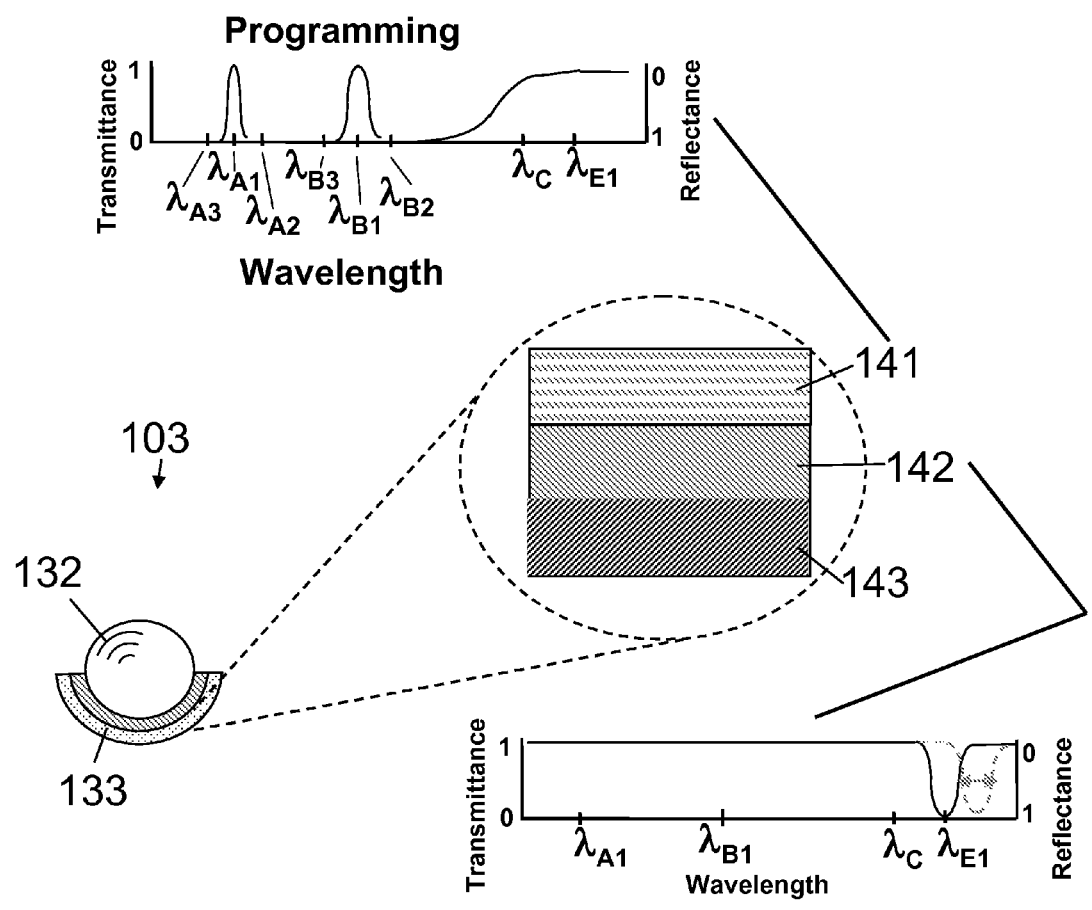
FIG. 5 illustrates the operation of an embodiment of a reflecting construct.

FIG. 5 illustrates how an embodiment of the retro-reflecting construct 103 selects its associated wavelengths for responding to interrogation and for being programmed. The wavelength selective reflection layer 142, the second part, reflects only the interrogation wavelength associated with that strip (e.g., λE1 but not λE2, λE3, and λE4 shown in FIG. 5), if it is programmed to be reflecting. If it is programmed to be not reflecting, that associated wavelength is transmitted into the black absorber 143 to be absorbed. The other wavelengths of the interrogation light (e.g., λE2, λE3, λE4) also are transmitted through the reflection filter 142 to be absorbed by the black absorber 143. Thus, each strip either will reflect its associated interrogation wavelength or not reflect that wavelength. The strip preferably will not reflect the other (non-associated) interrogation wavelengths. Thus, the background signal returned to the interrogator from the label can be reduced.

The photochromic material contained in the programmable wavelength selective reflection layer 142 likely will be responsive to a large range of wavelengths. A narrow-band response is achieved when the photochromic material is incorporated into an optical interference filter structure. Furthermore, the photochromic material likely can be programmed with a large range of wavelengths. The multi-peak transmission filter layer 141 selects the specific programming wavelengths within this range that are associated with a given retro-reflecting construct 103. The use of different multi-peak transmission filter layers 141 allows each construct 103 to be distinguishable, so that some constructs 103 can be programmed to be reflecting and others can be programmed to be non-reflecting.

The interrogation light 105 preferably is in a range of wavelength for which the photochromic material is essentially transparent. In particular, the interrogation light 105 may be in the eye-safe wavelengths range of 1500-1800 nm because the intensity of the light 105 provided by an interrogator can be higher. This higher intensity may enable the interrogator to be located at a larger standoff distance from the object labeled. Many photochromic materials do not have significant optical absorption at wavelengths in the range of 1500-1800 nm. Thus, the change in the refractive index of these materials is used. The photochromic material is incorporated into the programmable wavelength selective reflection layer 142 so that a change in its refractive index will produce a change in the reflectivity of the selective reflection layer 142 at the interrogation wavelength of interest. It is noted that some photochromic material could have absorption at the 1500-1800 nm wavelengths. However, those photochromic materials preferably have only weak absorption at these wavelengths. In that case, the characteristics of the multi-layer programmable wavelength reflection filter 142 can be simpler, involving primarily a change in index of only one component of the multi-layer programmable wavelength reflection filter 142.

Figure 6A:
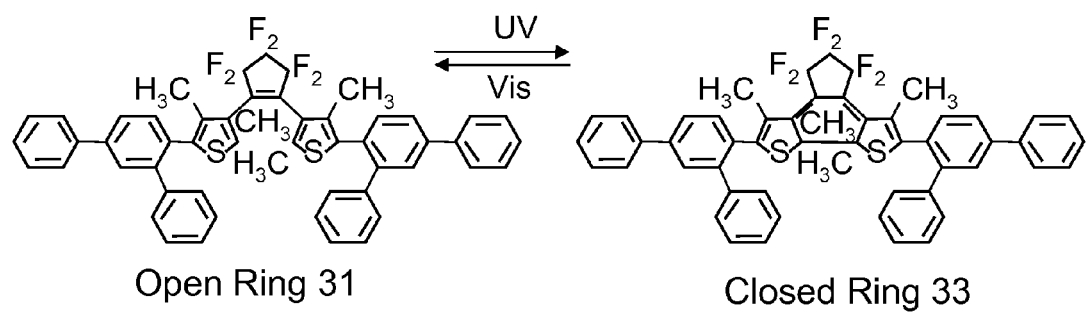
FIGS. 6a, 6b, and 6c show an embodiment and characteristics of a photochromic material used in the invention.
Figure 6B:
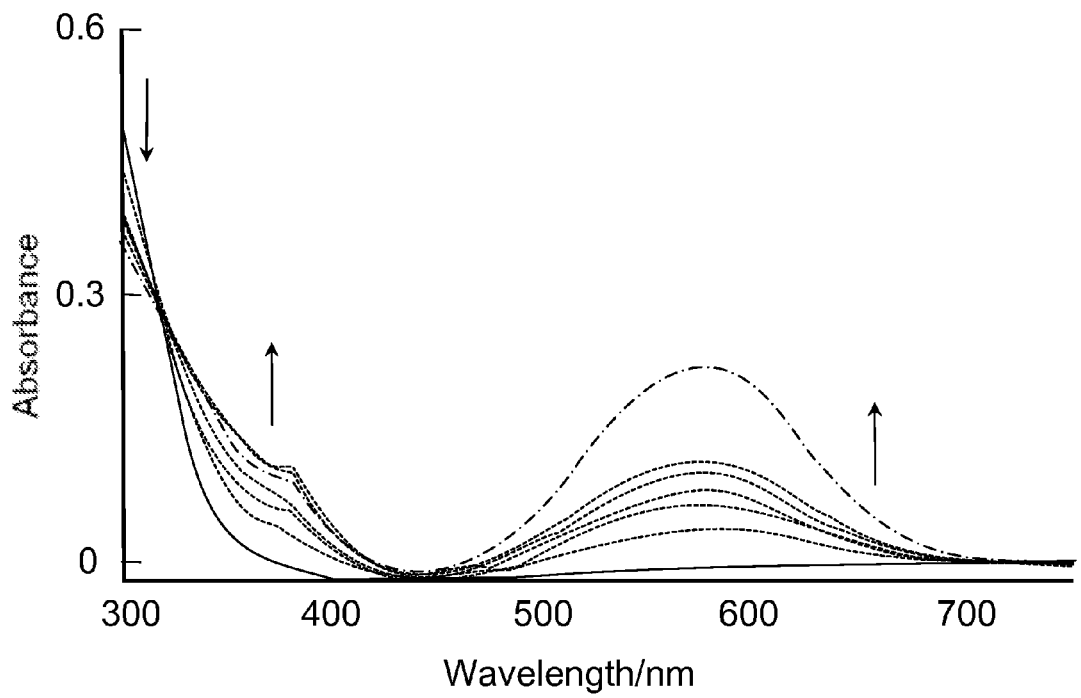

FIG. 6a presents an exemplary photochromic material that may be used in the present invention. The material is a 1,2-bis(2-methyl-6-(2,4-diphenylphenyl)-1-1benzothiophene-3-yl) perfluorocyclopentene. See, M. S. Kim, T. Sakata, T. Kawai and M. Irie, "Amorphous photochromic films for near-field optical recording," Japanese Journal of Applied Physics, vol. 42 (2003) pp. 3676-3681, herein incorporated by reference. The material can be converted between an open-ring isomer and a closed-ring isomer. The open-ring isomer has very little absorption of wavelengths greater than 350 nm. The closed-ring isomer, however, has a pair of strong absorption peaks at the wavelengths of 370-390 nm and 500-580 nm, as shown in FIG. 6b. These strong absorption peaks are accompanied by the refractive index of the closed-ring isomer being significantly different from the refractive index of the open-ring isomer.

The exemplary material shown in FIG. 6a can be converted between an open-ring isomer 31 and a closed-ring isomer 33. As shown in FIG. 6b, the open-ring isomer 31 has very little absorption of wavelengths greater than 350 nm. In contrast, the closed-ring isomer 33 has a pair of strong absorption peaks at the wavelengths of 370-390 nm and 500-580 nm. This substantial difference in absorption spectrum is accompanied by the refractive index of the closed-ring isomer 33 being substantially different from that of the open-ring isomer 31. In one example of photochromic material, the refractive index of the open-ring isomer 31 at 1553 nm is 1.621 whereas the refractive index of the closed-ring isomer 33 is 1.684. See M. K. Kim, H. Maruyama, T. Kawai and M. Irie, "Refractive index changes of amorphous diarylethenes containing 2,4-diphenylphenyl substituents," Chem. Materials, vol. 15 (2003), pp. 4539-4543, herein incorporated by reference. This exemplary photochromic material exhibits a change in index of more than 0.06 (or greater than 3.5%). This level of index change is observed over a large range of wavelengths including the wavelengths between 1500 and 1800 nm, as indicated in FIG. 3c. See J. Chauvin, T. Kawai and M. Irie, "Refractive index change of an amorphous bisbenzothienylethene," Japanese Journal of Applied Physics, vol. 40 (2001), pp. 2518-2522, herein incorporated by reference.

The exemplary photochromic material of FIG. 6 may be converted from its open-ring state to its closed-ring state by illuminating it with a light at a wavelength of 250-340 nm. This material may be converted from its closed-ring state back to its open-ring state by illuminating it with a programming light beam at a wavelength of 460-680 nm. Thus, the material can be programmed with a large range of programming wavelengths. The multi-peak transmission filter layer 141 that comprises the first part of the programmable reflecting coating 133 preferably may transmit one specific programming wavelength in the 280-340 nm band and one specific programming wavelengths in the 460-680 nm band.

A large change in refractive index may be achieved by using films that contain a large percentage of the photochromic material. Large percentage incorporation has been achieved in prior art photochromic films by forming films of amorphous photochromic materials, by forming liquid crystal films of the photochromic material, and by incorporating the photochromic material into a polymer (preferably into the backbone of the polymer). The material illustrated in FIG. 6a is one embodiment of an amorphous film. A person skilled in the art will note that materials other than these described above may be used as substitute to form such films that exhibit a large change in refractive index. The present invention is not intended to be and is not to be construed as limited to the materials described herein.

Figure 10A:
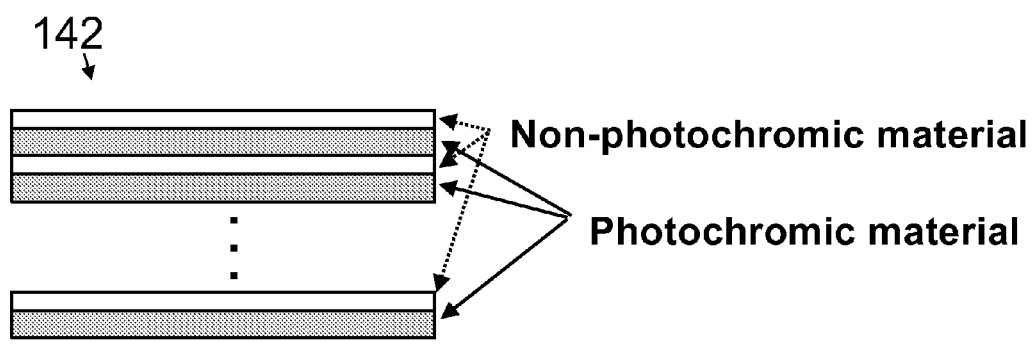
FIG. 10a is a sectional view of an embodiment of a programmable wavelength selective reflection layer.

Referring to FIG. 10a, an exemplary embodiment of the programmable wavelength selective reflection layer 142 is shown. The wavelength selective reflection layer 142 may be constructed from multiple layers of a photochromic material and a non-photochromic material. Each layer has a thickness that is an odd multiple of a quarter wavelength (in that material) of the desired reflection peak wavelength. This exemplary embodiment functions as a multi-layer interference filter that has 14 periods of layers having 5/4 wave thickness. The programmable wavelength selective reflection layer 142 is intended to selectively reflect interrogation light at a given interrogation wavelength but to not reflect other interrogation wavelengths. The refractive index of the non-photochromic material may be 1.35. The refractive index of the photochromic material may be 1.68 when the label piece is in it retro-reflecting state. In this case, the photochromic material is in its closed-ring state as discussed with respect to FIG. 6a. When the photochromic material is in its open-ring state, the reflection peak of the programmable wavelength selective reflection layer 142 is shifted such that the filter no longer reflects that specific interrogation wavelength. The total thickness of this exemplary reflection layer 142 may be approximately 40 μm.

Figure 10B:
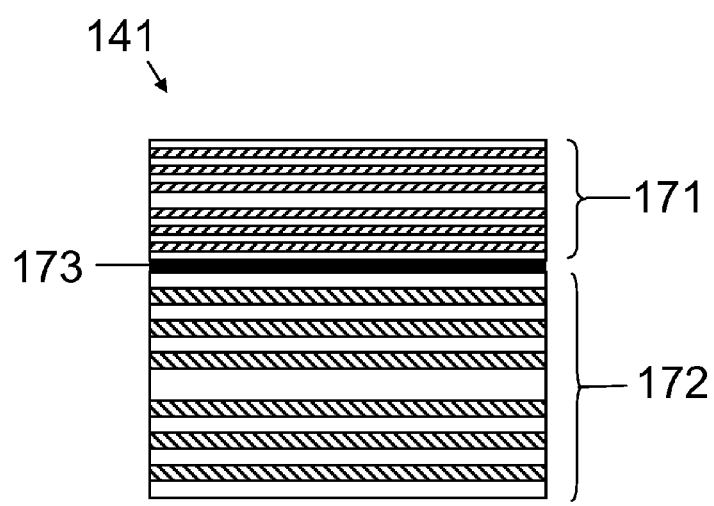
FIG. 10b is a sectional view of the construction of an embodiment of a multi-peak transmission filter layer.

Referring to FIG. 10b, an exemplary multi-peak transmission filter layer 141 may be constructed by cascading two Fabry Perot etalons 171, 172. Each of the etalons is an optical filter that has a narrow transmission peak. The wavelengths of those transmission peaks correspond to the two associated programming wavelengths of the retro-reflecting construct 103, λA and λB as shown in FIG. 5 Each mirror of these two etalons is formed by a 3-period quarter-wave reflective stack. The layers of that reflective stack may have refractive indices of 1.5 and 2.3. An etalon spacer 173 that establishes an optical cavity length of the etalons may have a refractive index of 2.3 or higher. In this exemplary embodiment, the etalon spacer 173 has a half-wave thickness. The first etalon 171 produces a narrow transmission peak at a particular programming wavelength. It may be approximately 320 nm and has sub-layers of thickness 50 nm and 40 nm. The second etalon 172 produces a narrow transmission peak at another programming wavelength. It may be a wavelength of approximately 640 nm and has sub-layers of approximate thickness 100 nm and 80 nm. The total thickness of this exemplary transmission filter layer 141 may be approximately 2 μm.

Referring back to FIG. 5, the black absorber layer 143 preferably comprises a material that preferably absorbs the light at the various interrogation wavelengths, and also the programming wavelengths, but has low reflection of that light. Non-limiting examples of material that may be used as the black absorber layer 143 may be gold blacks, silver blacks and carbon blacks. See, L. Harris, The Optical Properties of Metal Blacks and Carbon Blacks, Monograph Series No. 1 Dec. 1967 (Eppley Foundation for Research, Newport, R1), herein incorporated by reference. The optical reflectance of gold blacks is typically less than 1% in the wavelength range of the interrogation light 105. Gold black coatings that can be formed on electrically insulating materials, such as the retro-reflecting construct 103, are described in an article by Lehman, et al. See, J. Lehman, E. Theocharous, G. Eppeldauer and C. Pannell, "Gold-black coatings for freestanding pyroelectric detectors," Measurement Science and Technol., v. 14 (2003), pp. 916-922, herein incorporated by reference.

The total thickness of the programmable wavelength selective reflection layer 142 places a constraint on the minimum diameter of the spherical lens 132. The diameter of the spherical lens 132 may be at least 3 times and preferably at least 10 times larger than the total thickness of the reflection layer 142. In general, the larger the spherical lens 132 is compared to the total thickness of the programmable wavelength selective reflection layer 142, the better the retro-reflection characteristics of their composite structure.

The effectiveness with which the retro-reflecting construct 103 retro-reflects the interrogation light 105 can be degraded as a result of spherical aberration from the spherical lens 132. This spherical aberration occurs when the spherical lens 132 has a uniform refractive index. However, the spherical aberration can be reduced substantially by using a spherical lens that has a refractive index gradient in the radial direction. See, Y. Koike, Y. Sumi and Y. Ohtsuka, "Spherical gradient-index sphere lens," Applied Optics, vol. 25 (1986), pp. 3356-3363, herein incorporated by reference. Even better performance is anticipated with a spherical lens comprising a graded index core and a cladding of uniform index. See, K. Kikuchi, T. Morikawa, J. Shimada and K. Sakurai, "Cladded radially inhomogeneous sphere lenses," Applied Optics, vol. 20 (1981), pp. 388-394, herein incorporated by reference. When the spherical lens 132 has a graded-index, the retro-reflecting construct 103 preferably should have the spacer layer 134 of the appropriate thickness, as discussed above (paragraph 50).

Figure 11:
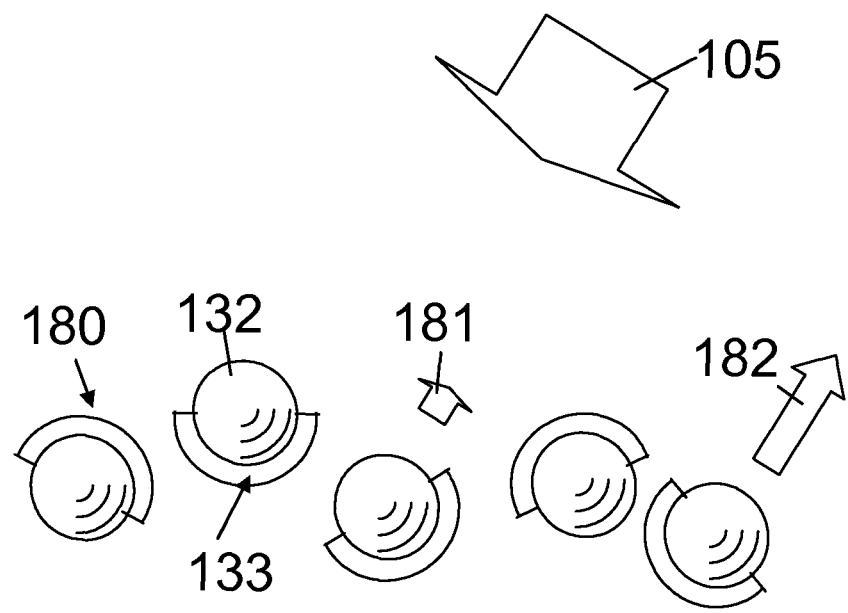
FIG. 11 illustrates an exemplary embodiment of the current invention in operation.

Referring to FIG. 11, generally less than half of the surface of the spherical lens 132 is covered with the programmable reflecting coating 133. The interrogation light 105 that illuminates the un-covered portion of a spherical lens bead will be focused onto the programmable reflecting coating 133. The selected wavelength component of the interrogation light 105 then reflects off the reflecting coating 133 according to the programmed state and is directed via the spherical lens 132 back toward the source of the interrogation light 105. When a collection of retro-reflecting constructs 103 has been dispersed onto a labeled surface as shown in FIG. 3b, probably only some of the spherical lens 132 will have their un-covered portions facing the incoming interrogation light 105 and be able to retro-reflect the interrogation light 105 back toward the interrogator. Those retro-reflecting constructs 103 that have their programmable reflecting coating facing the interrogator will not act as retro-reflectors. The amount of retro-reflection also will depend on the exact orientation of the construct 103 with respect to the interrogation light 105. The interrogation light 105 can illuminate both the un-covered portion of the spherical lens 132 and the portion that is covered by the programmable reflecting coating 133. The variation in the effective illumination of the collection of retro-reflecting construct 103 can result in a variation in the retro-reflection response such as no retro-reflection 180, weak-retro-reflection 181 or strong-retro-reflection 182.

In another embodiment, the retro-reflecting constructs 103 can be applied to the labeled surface at different times. This can be done to increase the number of interrogation and programming wavelengths available. This also can be done to re-supply those retro-reflecting constructs 103 types whose number may have been reduced through wear such as when some constructs 103 that were applied long ago have become detached from the labeled surface.

A simple binary wavelength code has been presented as an example wherein each wavelength represents a bit of the code. Each bit can have a logical 1 value (reflecting) or a logical 0 value (non-reflecting). Other wavelength-based codes also are possible. In other exemplary embodiments, combinations of wavelength and multiple intensity levels could be used to form a coded response. For improved code detection, the code words containing all 0s or all 1 s may be excluded. Thus, a 3 wavelength code can have 6 different code words; a 5 wavelength code can have 30 different code words and a 9 wavelength code can have 510 different code words.

Figure 6C:
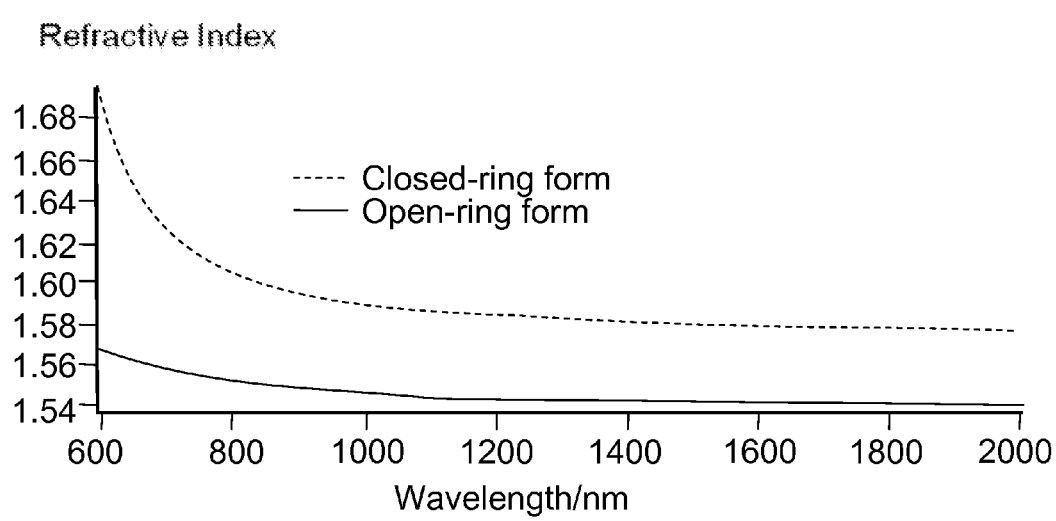

If the material shown in FIGS. 6a, 6b and 6c is used for the photochromic component of the programmable wavelength selective reflecting filter 142 of all the different constructs 103 of the label 101, the N sets of programming wavelengths (where N is the number of code wavelengths) must be defined within the 250-340 nm range and within the 460-680 nm range (the absorption peaks for that material). If N is 4, a possible choice of the programming wavelengths are 280, 300, 320 and 340 nm for selecting the close ring closed-ring state of the photochromic material and 560, 600, 640 and 680 nm for selecting the open-ring state. If N is 4, one may want to choose 4 interrogation wavelengths that lie in the range between 1550 and 1800 nm. For example, one may choose wavelengths that are spaced by 80 nm (e.g., 1550 nm, 1630 nm, 1710 nm and 1790 nm) to cover that entire range.

As an example of the design and construction of the multi-peak transmission filter 141 and the programmable wavelength selective reflection filter 142, the wavelengths of 320 nm and 640 nm may be selected as the programming wavelengths and 1710 as the interrogation wavelength associated with an exemplary reflecting construct 103 of an optical label 101. The programmable wavelength selective reflecting filter 142 has a reflection peak at 1710 nm. The multi-peak transmission filter 141 has a pair of transmission peaks located at 320 nm and 640 nm. The multi-peak transmission filter 141 also has fairly high transmission for 1710 nm. The desired spectral widths of the filter peaks depend on the number of wavelengths in the code (which is 4 for this example).

The multi-peak transmission filter 141 as shown in FIG. 5 may be constructed by cascading two Fabry Perot filters. Each Fabry Perot filter is an optical etalon comprising two reflectors separated by a spacing distance. Preferably, the reflectors have the desired reflection level for the etalon over the range of programming wavelengths (e.g., 280-340 nm) addressed by that etalon but have substantially lower reflection for the other range of programming wavelengths (e.g., 560-680 nm) as well as the range of interrogation wavelengths (e.g., 1550-1790 nm). In this case, the transmission through that etalon will be fairly high at those other wavelength ranges. This permits multiple etalons that operate at different wavelength ranges to be cascaded together to obtain a multi-peak transmission filter. Each etalon produces a narrow transmission window within the wavelength range over which its two reflectors reflect and a broad transmission window over those wavelengths for which its two reflectors do not reflect substantially.

Figure 7A:
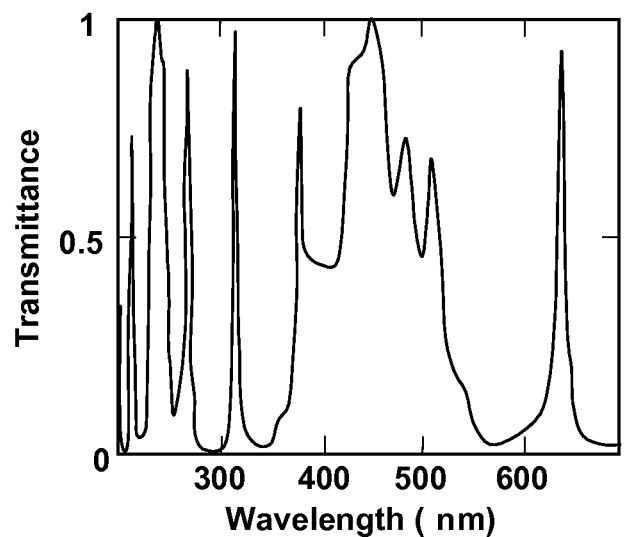
FIGS. 7a and 7b shows the transmission spectra of an exemplary embodiment of a multi-peak transmission filter.
Figure 7B:
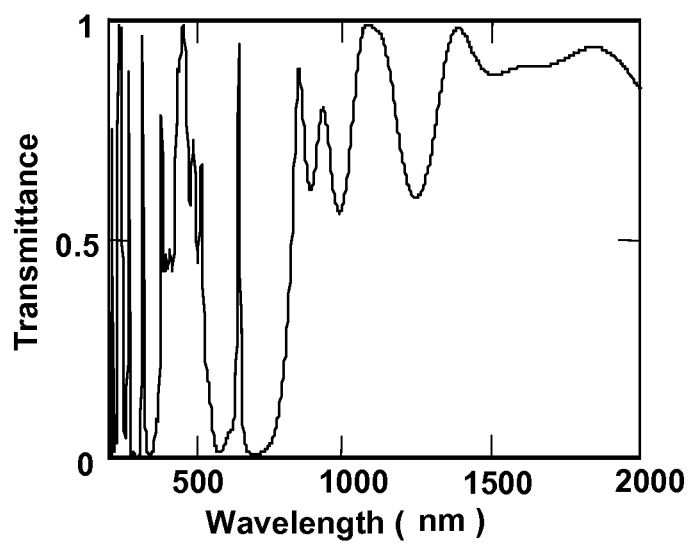

FIG. 7a shows the transmission spectrum of an exemplary multi-peak transmission filter 141 for the first part of the programmable reflecting structure 133. There are transmission peaks centered at 320 nm and 640 nm to pass the two desired programming wavelengths. Note that the filter has low transmission for the other 6 programming wavelengths of this example. Referring to FIG. 7b, furthermore, there also is substantial transmission for wavelengths greater than 1400 nm. The two Fabry-Perot etalons comprising this filter each have mirrors comprising interference stacks with 2 or more periods of alternating high-index and low-index layers of quarter-wave thicknesses at the wavelength of the transmission peak. The spacer in each Fabry-Perot etalon has a half wave thickness at the transmission peak wavelength. Only a small gap separates the two cascaded Fabry-Perot etalons. The total thickness of this composite multi-peak transmission filter 141 structure can be less than 2 micrometers. Note that the transmission spectrum of this multi-peak transmission filter 141 has substantial features at those wavelengths outside of the ranges of programming and interrogation wavelengths. However, this often is acceptable for the label 101 and does not degrade the performance of the label 101.

FIG. 8 shows the reflection spectra of an exemplary multi-layer reflection filter 142 for the second part of the programmable reflecting structure 133. This interference filter 142 is constructed from multiple layers of a photochromic material and a non-photochromic material. In this case, the multi-layer reflection filter 142 has a peak at 1710 nm when the photochromic material is in its closed-ring state (refractive index=1.68). The width of this reflection peak is selected such that the reflection is low for the adjacent interrogation wavelengths of 1630 nm and 1790 nm. The reflection peak is shifted to shorter wavelengths when the photochromic material is in its open-ring state (refractive index=1.62). The reflection at a wavelength of 1710 nm is reduced from nearly 1.0 for the unshifted reflection filter to below 0.1 for the shifted reflection filter.

Thus, the extinction ratio or signal contrast obtained with this change in refractive index is better than 10 dB. Note that the reflection at the adjacent interrogation wavelengths still is low even for the shifted filter. A total of 14 periods of 5/4 wave thick layers are used to construct this exemplary interference reflection filter 27, whose spectrum is shown in FIG. 5. The total thickness of this exemplary filter is approximately 40 µm.

A potential weakness of the exemplary photochromic material shown in FIG. 6 is that its programming wavelengths lie in the wavelength range where there is substantial irradiation outdoors (e.g., from sunlight). Thus, ambient irradiation may gradually cause the reflecting constructs 103 to depart from their programmed state. Therefore, it may be preferable to select other photochromic materials that have a gated reactivity. See M. Irie, "Diarylethenes for memories and switches," Chemical Review, v. 100 (2000), pp. 1685-1716, herein incorporated by reference. As an example, a gated photochromic material may require some other input besides the programming light beam 121 as shown in FIG. 2, to cause it to convert efficiently from one state to the other. One possible gating mechanism is temperature.

Some of the photochromic materials that have a gated reactivity can convert between their open-ring and closed-ring isomers when the temperature is increased. When these materials are kept at room temperatures, the conversion process occurs very slowly. In one exemplary embodiment of the invention, a conditioning light illuminating the constructs 103 may be absorbed by the black absorber 143 material that is underneath and in close contact with the photochromic material, whereby the absorbed conditioning light heats the black absorber and thereby also heats the photochromic material. If an eye-safe wavelength is used for the conditioning light, substantial conditioning energy can be supplied to the label 101 by the programmer 15.

Another embodiment may comprise photochromic materials that can be programmed with wavelengths at which the ambient radiation is weak. This may be done by selecting deep UV wavelengths (below 300 nm) and a set of IR wavelengths (e.g., between 1380 and 1420 nm) where there is substantial atmospheric absorption of the sunlight. Those wavelengths (e.g. between 300 nm and 1380 nm) where there is substantial solar irradiance could be rejected by an optical filter that is placed above the programmable reflecting structure 133.

Figure 9:
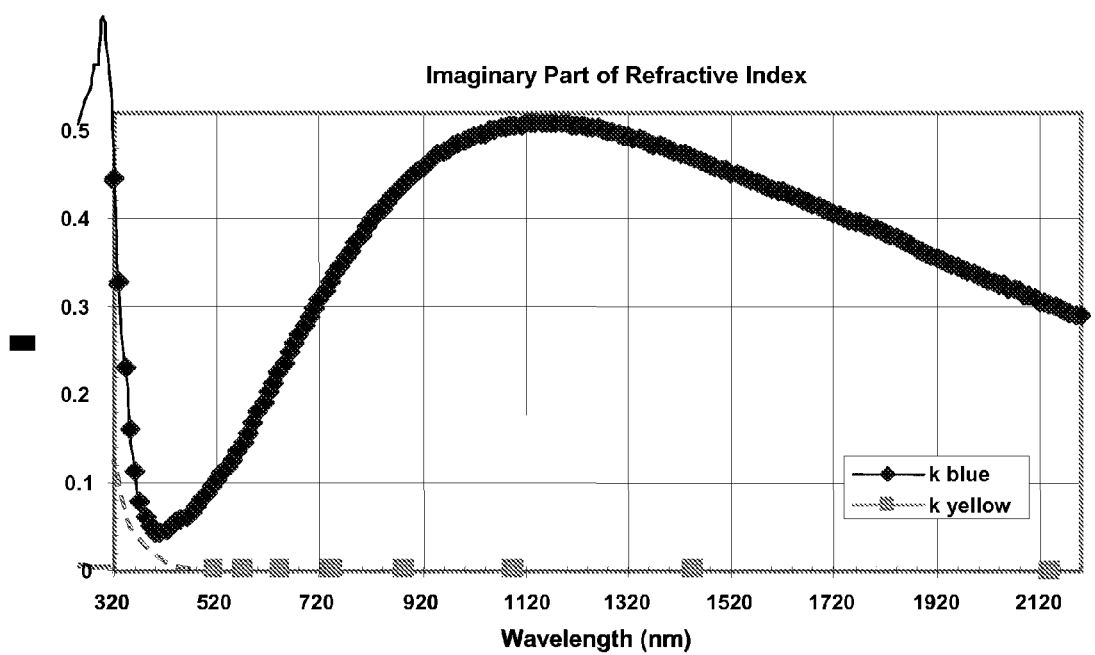
FIG. 9 shows the absorption spectrum of an exemplary prior art inorganic photochromic material.

Referring to FIG. 9, an example of an inorganic photochromic material that may be used in the programmable wavelength selective reflection filter 142 (shown in FIGS. 4 and 5) is tungsten oxide. Tungsten oxide can be optically converted from a more oxidized state (e.g., WO3) to a less oxidized state. See R. Bussjager, J. M. Osman, E. Voss and J. Chaiken, "Tungsten oxide based media for optical data storage and switching applications," Proceedings of 1999 IEEE Aerospace Conference, pp. 343-349, herein incorporated by reference. In one exemplary embodiment, the oxidized (yellow) state has an absorption peak located at 200-320 nm with little absorption at longer wavelengths. The oxygen deficient (blue) state has a broad absorption peak located at wavelengths longer than 1000 nm. It is possible to have these absorption peaks shifted to other wavelengths by using other versions of tungsten oxide.

The tungsten oxide can be used with a multi-peak transmission filter 141 that passes programming light at those wavelengths (below 300 nm and between 1380 and 1420 nm) for which there is little solar irradiance. The substantial change in the absorption spectra of the two states of a given tungsten oxide film is accompanied by a corresponding change in the refractive index. This change in the refractive index is used to shift the peak wavelength of the programmable wavelength selective reflection filter 142, as discussed above. Note, however, that there is substantial absorption by the oxygen deficient state at the range of interrogation wavelengths. Thus, the programmable wavelength selective reflection filter 142 incorporating this photochromic material should be designed to reflect the desired interrogation wavelength when the photochromic material is in its oxygen rich state. The tungsten oxide has very little absorption at the interrogation wavelengths when in this state. The degraded height of the shifted reflection peak, a result of the absorption of interrogation light by the oxygen deficient state, is then of much less consequence.

In another embodiment, the tungsten oxide can be used as a gated photochromic material. For example, tungsten oxide can be converted between its two states by illuminating it with conditioning light ($\lambda C$) at an infra-red (IR) wavelength in addition to the programming light ($\lambda A1$, $\lambda B1$) at shorter wavelengths. See R. Bussjager, et al., "Using tungsten oxide based thin films for optical memory and the effects of using IR combined with blue/green wavelengths," Japanese Journal of Applied Physics, vol. 39 (2000), pp. 789-796, herein incorporated by reference.

Furthermore, tungsten oxide can have substantial absorption even at wavelengths longer than 2000 nm. If the optical intensity levels at the programming wavelengths are set low enough, it is necessary to illuminate the tungsten oxide film with both the IR conditioning light and the programming light beam in order to obtain substantial conversion of the state. Given the long-wavelength sensitivity of the blue tungsten oxide, IR conditioning wavelengths can be used for which high ambient levels do not occur naturally. In this case, the deep UV light could be used to convert the tungsten oxide to the blue state and the combination of the conditioning light and a shorter wavelength light (e.g., at 950 nm) could be used to convert the tungsten oxide to the yellow state. The IR conditioning light could be at wavelengths of 1380-1420 nm or 1800-2000 nm, for example.

Figure 12:
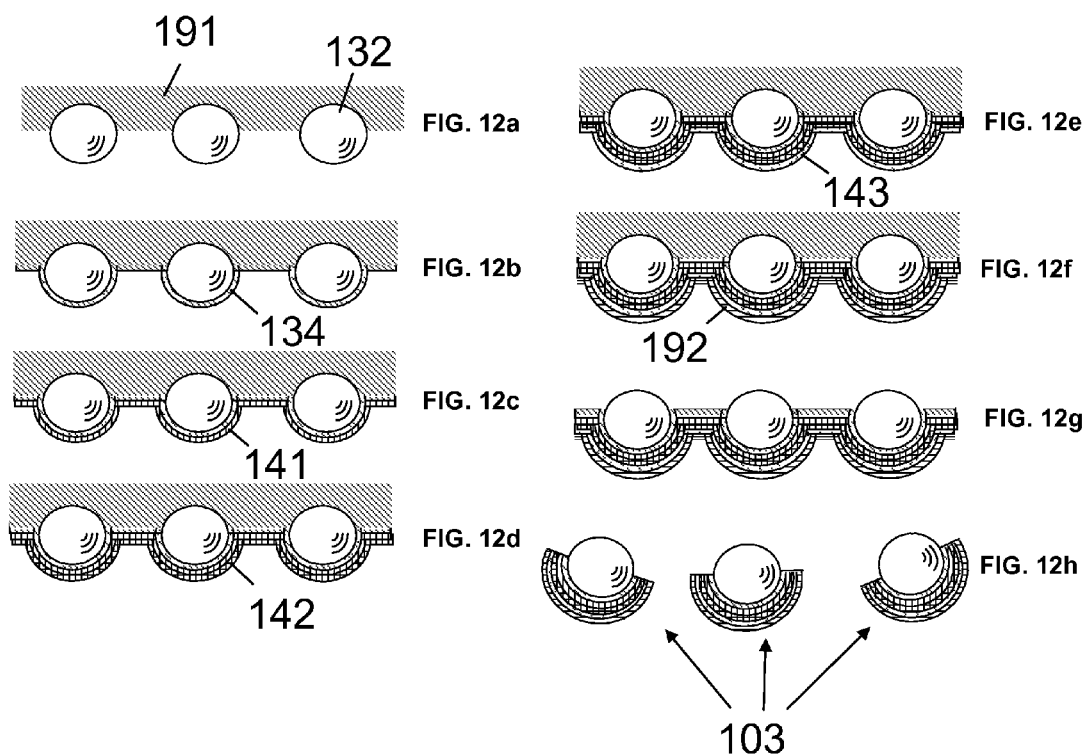
FIG. 12 illustrates a method to fabricate an embodiment of the invention.

Referring to FIG. 12a-h illustrates an exemplary process 190 to fabricate the retro-reflecting constructs 103 described in the previous sections. The process 190 is derived from a process for manufacturing prior art retro-reflective beads. See, for example, U.S. Pat. No. 2,963,378, herein incorporated by reference. First, a carrier 191 is constructed that contains a soft layer into which spherical lens 132 can be embedded. Multiple spherical lens 132 are then embedded into the carrier 191, with a portion of the lens exposed (FIG. 12a). An optional spacer layer 134 of spacer material is applied over the exposed surfaces of the embedded spherical lens 132 (FIG. 12b). A layer of multi-peak transmission filter layer 141 is then applied over the exposed portions of the spherical lens 132 (FIG. 12c). A layer of programmable wavelength selective reflection layer 142 is applied over the transmission filter layer 141 (FIG. 12d). Then, a black absorber layer 143 is applied over the selective reflection layer 142 (FIG. 12e). The three coatings 141, 142 and 143 collectively form the programmable reflective coating 133 as shown in FIGS. 4 and 5. A final protective coating 192 may, optionally, be applied over the black absorber layer 143 (FIG. 12f). Next, the carrier 191 is removed (or the coated spherical lens 132 are detached from the carrier 191) to make available the individual retro-reflective spherical lens (FIG. 12h).

Some of the coated spherical lenses 132 may still remain attached to each other, being connected together by the thin portions of the programmable reflecting coating 133, the optional spacer layer 134 and the optional protective coating 192 deposited in the regions of exposed carrier 191 between the spherical lens 132. This thin material may be removed by some non-limiting means such as brushing to separate the individual retro-reflecting construct 103 (FIG. 12h).

Figure 13:
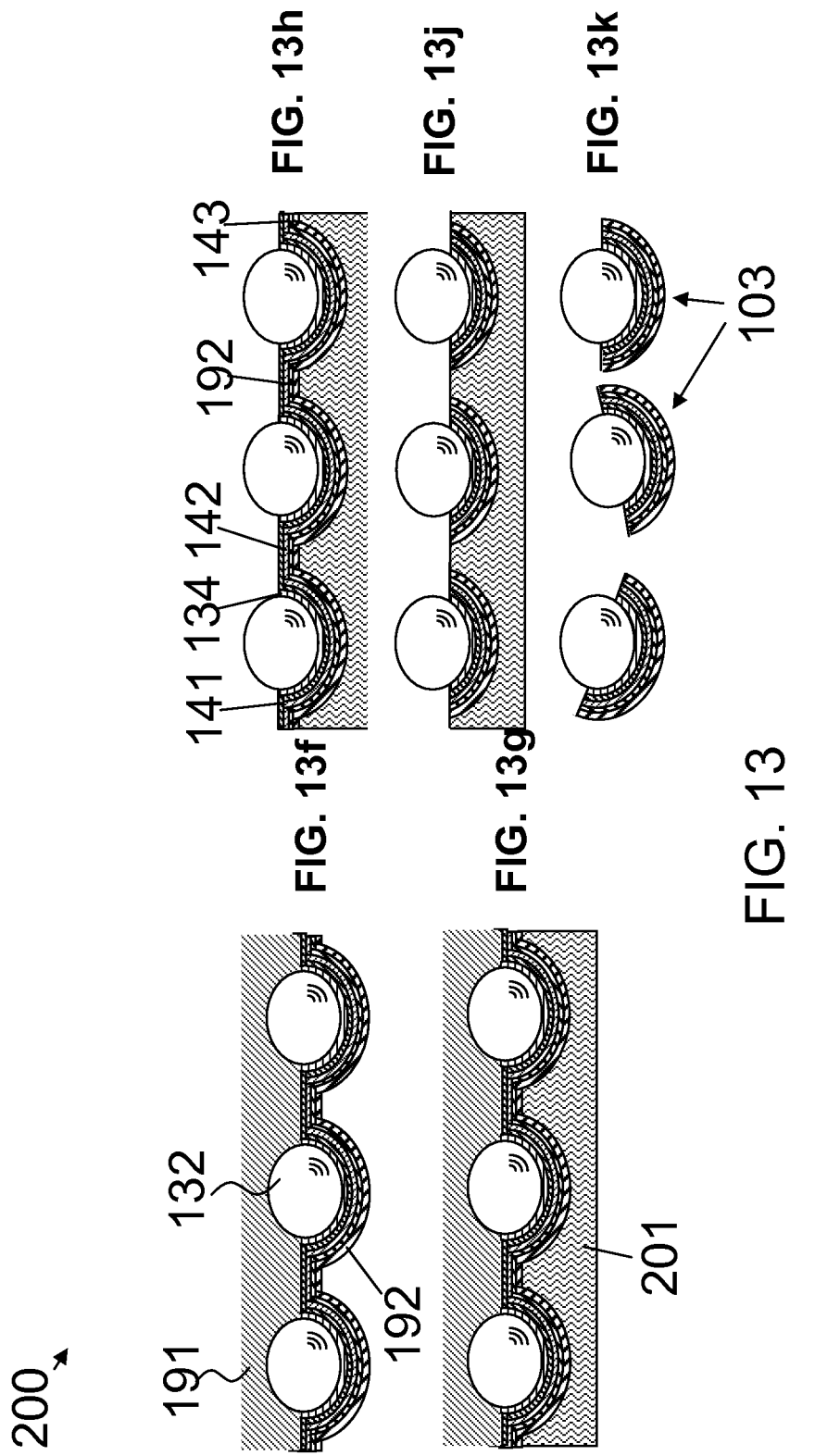
FIG. 13 illustrates another method to fabricate an embodiment of the invention.

Referring to FIG. 13, it illustrates another exemplary process 200 to separate the individual retro-reflecting construct 103, instead of breaking through the thickness of the spacer layer 134, the programmable reflecting coating 133 and the protective coating 192. The three coatings 141, 142 and 143 collectively form the programmable reflective coating 133 as shown in FIGS. 4 and 5. A removable backing layer 201 is attached to the coated lens after the protective coating 192 has been applied, and before the carrier 191 is removed (FIG. 13g). The carrier 191 is then removed (FIG. 13h) in a manner similar to that described above with regard to FIG. 12. The front surfaces of the spherical lens 132 are thereby exposed. The spherical lens 132 protects a part of the coating that is on its back surface. However, the spacer layer 134, programmable reflecting coating 133, and protecting coating 192 that lies in the regions between the lenses 132 are exposed. These layer 134 and coatings 133, 192 may be removed by some non-limiting means such as wet or dry etching (FIG. 13j). For example, the spacer layer 134, the multi-peak transmission filter layer 141 and the programmable wavelength selective reflection layer 142 may comprise organic materials. These organic materials may be etched by oxygen plasma or by reactive ion etching with an oxygen-containing gas. The etchant preferably should be a type of which the lens 132 is not responsive thereto. The lens 132 preferably is a silicate glass material. Other selective etchants could be used to remove the black absorber layer 143 and the protective coating 192. The etching process leaves the retro-reflecting constructs 103 mostly detached from each other, being attached primarily by the backing layer 201. The backing layer 201 is then removed to release the individual constructs 103 (FIG. 13k).

Figure 14:
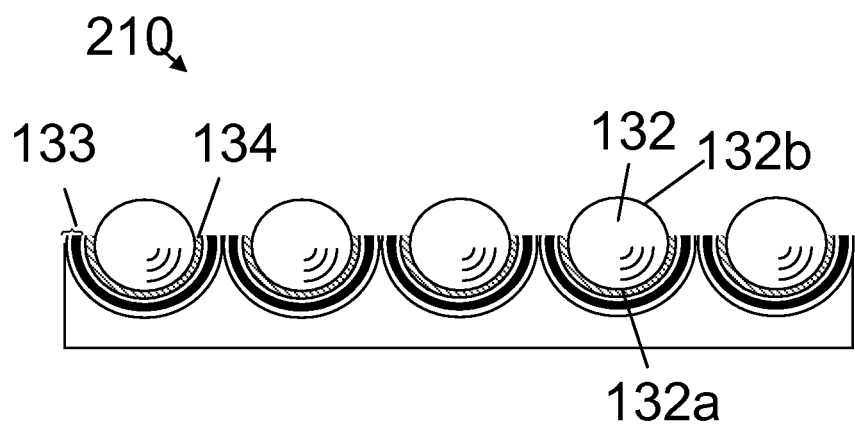
FIG. 14 is a sectional view of an embodiment of the invention in the form of a labeling strip with spherical lenses.

FIG. 14 presents another preferred embodiment of the present invention in the form of a labeling strip 210. FIG. 14 illustrates a cross sectional view of the strip 210 that provides enhanced retro-reflection. The strip 210 comprises one or more spherical lens 132 that serves as an optical lens. The programmable reflecting coating 133 coats a first portion 132a of each spherical lens 132. A second portion 132b of the spherical lens 132 is not coated with the reflecting coating 133. When the uncovered second portion of the spherical lens 132 is exposed to air, the focal plane may be located at the surface of the first portion 132a of the lens 132. When an additional coating layer or film covers the surface of the second portion 132b of the lenses, the optional spacer layer 134 may be interposed between the lens 132 and the programmable reflecting coating 133. The spacer layer 134 preferably has a thickness to establish the programmable wavelength selective reflection layer 142 at the focal plane of the spherical lens 132 when the lens 134 is embedded entirely within a film. The total thickness of the programmable reflecting coating 133 constrains the preferred minimum diameter of the spherical lens 132.

The combination of the size of the spherical lens 132, the total thickness of the programmable reflecting coating 133 and the thickness of the optional spacer layer 134 determines the thickness of the strip 210 embodiment. When the labeling strip 210 is to be used as a yarn, the width of a strip 210 is preferably two to five times larger than the thickness of that strip 210. A strip having such an aspect ratio in its dimensions is more likely to lie flat when it is woven or knitted into a label fabric, with the wider side of the strip in the plane of the fabric. In some embodiments a strip 210 may contain spherical lens on both of its sides. In these embodiments, the yarn will be retro-reflecting even though it is flipped, which may occur when that yarn is woven into a fabric. Constraints on the weight and stiffness of a labeled fabric may limit the maximum width and thickness of the label strip 210 in it.

Figure 15:
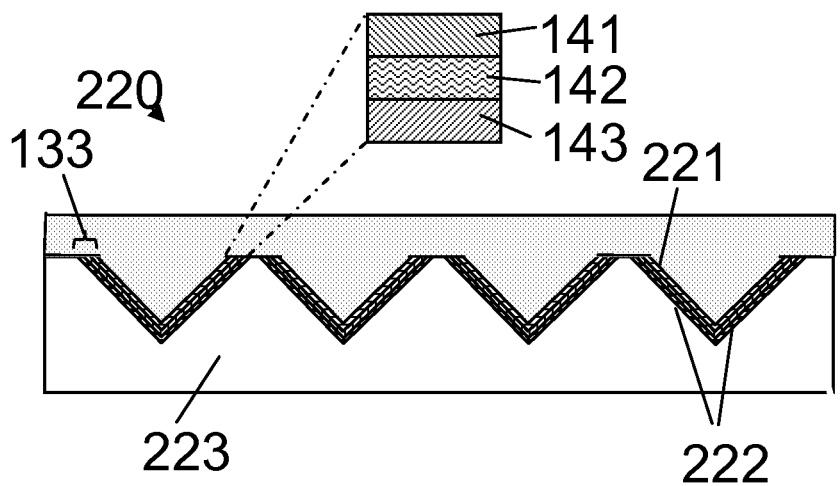
FIG. 15 is a sectional view of an embodiment of the invention in the form of a labeling strip with corner cube reflectors.

FIG. 15 shows another exemplary embodiment of the present invention in the form of a labeling strip 220 comprising corner cube reflectors 221 or modified versions of such reflectors disposed on a substrate 223. In this embodiment, the programmable reflecting coating 133 is formed on the multiple back reflecting surfaces 222 of the corner cube reflector 221. A corner cube reflector 221 may have two or more back reflecting surfaces 222. At least one or preferably all of these back reflecting surfaces 222 contains a programmable reflection coating 133. Any back reflecting surface 222 that is not coated with the programmable reflecting coating 133 are preferably coated with broadband reflectors, such as a metal film. In this way, the retro-reflectance from the corner cube reflector 221 can be programmed. Retro-reflecting sheets comprising corner cube reflecting structures are described in U.S. Pat. Nos. 2,310,790; 3,712,706 and 4,895,428, herein incorporated by reference.

A characteristic of a corner cube reflector 221 is that a light may be incident onto a back reflecting surface 222 at a large angle, relative to the surface normal. Thus, a conventional multi-layer optical interference filter design would not be appropriate for use in the programmable reflecting coating 133, since its reflection characteristics are appropriate only over a small range of incident angles relative to the surface normal. These conventional multi-layer filters make use of non-birefringent materials in their multiple layers. The range of incident angles is limited partly because the optical path is longer for light incident at larger angles relative to the surface normal. As a result, the effective thickness of the multiple layers becomes larger than what would be optimal for the desired filter response.

A multi-layer optical interference filter that retains its desired reflection spectrum over a much larger range of incident angles may be achieved by using appropriate combinations of suitably engineered optically birefringent materials. See, for example, U.S. Pat. Nos. 5,783,120 and 5,882,774, herein incorporated by reference. With the desired birefringent material, the optical refractive index for the component of the incident light that is normal to the surface is different from the optical refractive index for the component of the incident light that is parallel to the surface normal. The desired birefringent material has an appropriately smaller refractive index for the light component that is parallel to the surface than for the light component that is normal to the surface. The difference in refractive indices is selected such that the birefringent layer has approximately the same optical thickness (which is the arithmetic product of the physical distance traversed by the incident light and the refractive index) for light incident at a large angle and light incident at the surface normal. This selection of the refractive index components also is constrained by the need to establish the necessary refractive index contrast at the interface between two adjacent layers of the interference filter. Such index contrast will need to be different for the two light components if the reflection of light by that interface is to not become suppressed at Brewster's angle.

Similar to other embodiments of the present invention, the programmable reflecting coating 133 for a labeling strip based on corner cube reflectors has three parts. The first part is a multi-peak transmission filter layer 141. This multi-layer transmission filter may be constructed from one or more layers of birefringent materials, as described above. The second part is a multiple-layered programmable wavelength selective reflection layer 142. One layer component of this programmable wavelength selective reflection layer 142 may be a non-photochromic birefringent material. The other layer component may be a photochromic material. Further, the photochromic material is preferably birefringent. Such a photochromic material may be obtained by doping a birefringent polymer such as polyethylene naphthalate or polyethylene terephthalate with an appropriate photochromic molecule such as one of the diarylethenes discussed in the descriptions of the other embodiments herein of the Programmable Optical Label invention. The third part is the black absorber layer 143.

Figure 16:
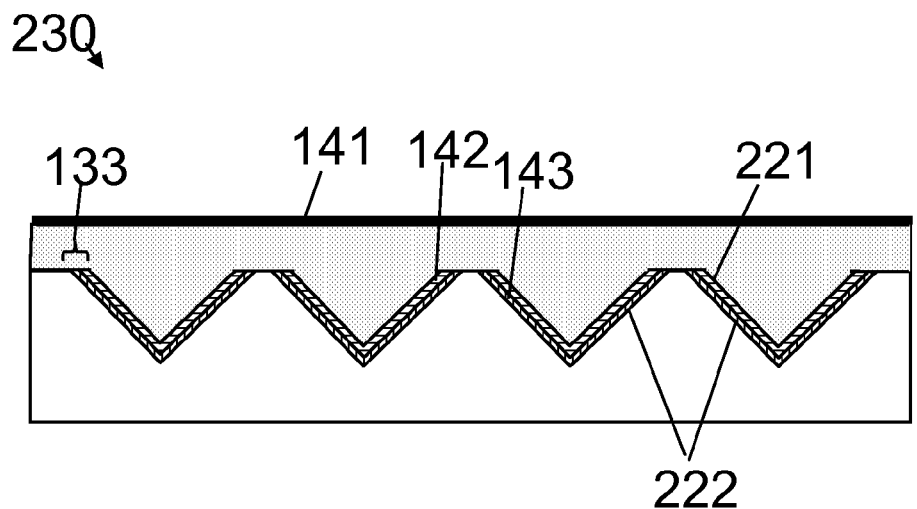
FIG. 16 is a sectional view of another embodiment of the invention in the form of a labeling strip with corner cube reflectors.

Referring to another exemplary embodiment 230 shown in FIG. 16, the multiple parts of the programmable reflecting coating 133 need not be directly adjacent to each other. The multi-peak transmission filter layer 141 could be located separately from the other parts of the reflecting coating 133. In particular, the multi-peak transmission filter layer 141 is located at the front surface of a corner cube reflector (instead of at the back surface as in the previous embodiment). The other parts of the programmable reflecting coating 133 are located at the back reflecting surfaces 222 of the corner cube reflectors 221. The incident light first encounters the multi-peak transmission filter layer 141 and then passes through the corner cube reflectors 221, being selectively reflected from the back reflecting surfaces 222 of the corner cube structure. The programmable wavelength selective reflection layer 142 may be programmed to selectively reflect a particular interrogation wavelength. The black absorber layer 143 absorbs the light that reaches it and prevents those wavelengths from being retro-reflected.

Since the multi-peak transmission filter layer 141 may receive incident light from a large range of angles, it may preferably contain one or more layers of birefringent materials that enable the multi-peak transmission filter layer 141 to maintain its desired transmission spectrum over a larger range of incident angles, as discussed above in relation with the previous embodiments.

Figure 17:
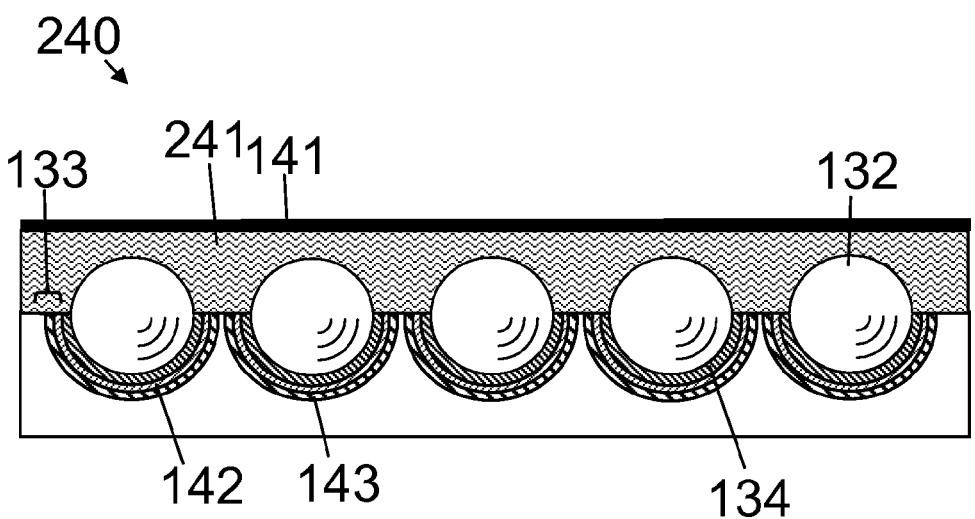
FIG. 17 is a sectional view of another embodiment of the invention in the form of a labeling strip with spherical lenses.

FIG. 17 illustrates another exemplary embodiment 240, which is based on spherical lens 132. The multi-peak transmission filter 141 of the embodiment is located at the front surface of the beaded retro-reflector structure (instead of at the back sides of the beads as in some previous embodiments). The embodiment 240 shown in FIG. 17 is similar in many ways to the labeling strip 220 illustrated in FIG. 12 but this embodiment 240 also contains a cover layer 241 over the front sides of the spherical lens 132. The multi-peak transmission filter layer 141 is located at the front side of the cover layer 241. The other parts of the programmable reflecting coating 133 are located at the back sides of the spherical lens 132. The incident light first encounters the multi-peak transmission filter layer 141 and then passes through the cover layer 241, spherical lens 132 and spacer layer 134, before being selectively reflected from the programmable wavelength selective reflection layer 142. The programmable wavelength selective reflection layer 142 may be programmed to selectively reflect a particular interrogation wavelength. The black absorber layer 143 absorbs the light that reaches it and prevents those wavelengths from being retro-reflected. The multi-peak transmission filter layer 141 may receive incident light from a large range of angles. Thus, it preferably may contain one or more layers of birefringent materials that enable the multi-peak transmission filter layer 141 to maintain its desired transmission spectrum over a larger range of incident angles, as discussed above in relation to the previous embodiments.

Figure 18:
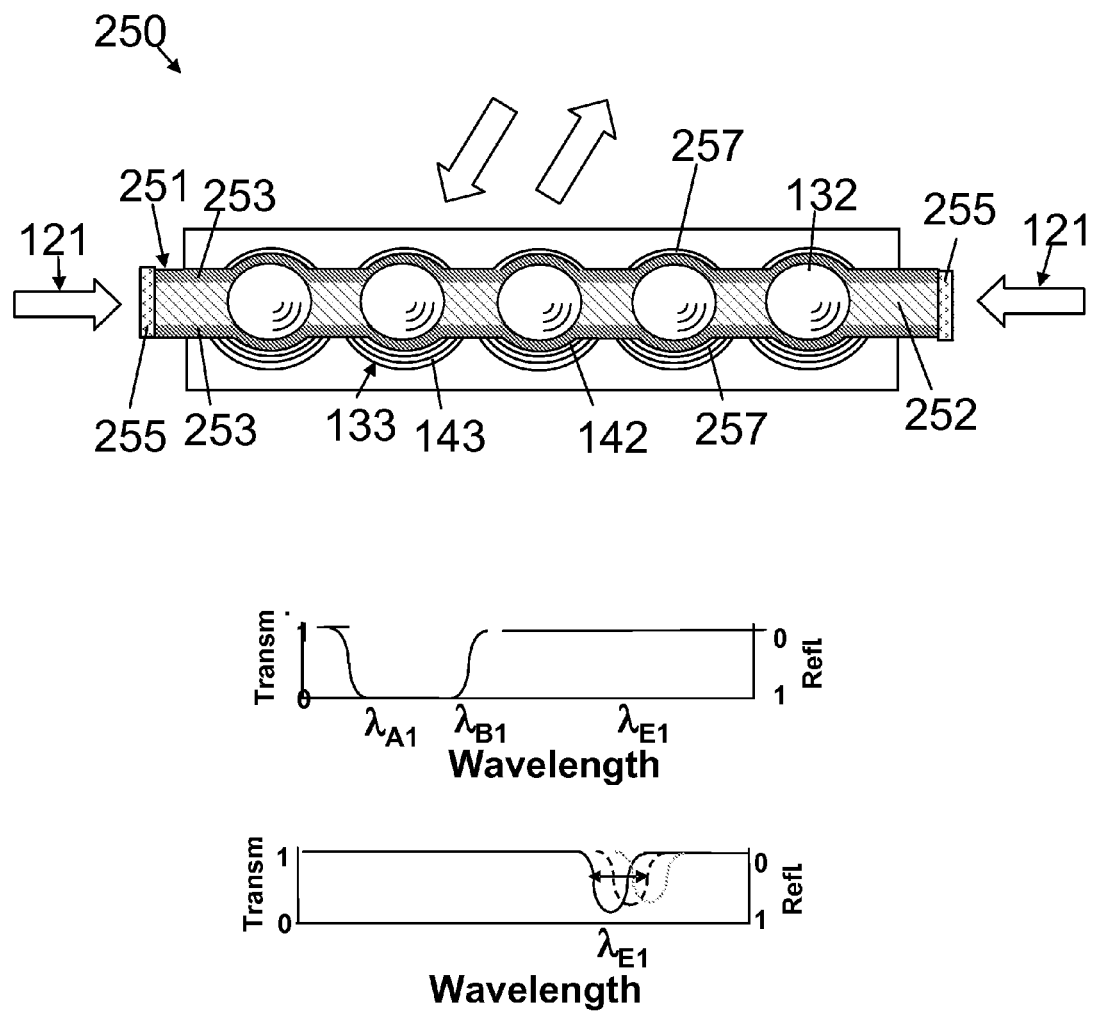
FIG. 18 is a sectional view of an embodiment of the invention in the form of a waveguide with associated programming and interrogation wavelengths.

FIG. 18 illustrates another exemplary embodiment as a retro-reflecting strip 250 that contains an optical waveguide 251. The programming light is supplied through the optical waveguide 251 instead of being supplied through the front face of the strip 250. The waveguide 251 has a core 252 that also includes spherical lens 132. The portions of the waveguide core 252 between adjacent spherical lenses 132 as well as at the outer ends of the waveguide 251 have the same refractive index. The waveguide core 252 and the spherical lenses 132 are sandwiched between layers of lower index material, the spacer, which acts as a cladding 253. The combination of core 252 and cladding 253 functions as an optical waveguide for the programming light. A programming light beam 121 is supplied from one or more ends of the waveguide 251. Optional filters 255 that select the desired set of programming wavelengths for a particular strip can be placed at one or more ends or edges of the waveguide. These filters may be similar to the multi-peak transmission filter layer 141 shown in FIG. 10b.

The spherical lenses 132 serve as engineered "scattering" elements that direct the programming light 121 out of the path of the waveguide 251 toward a programmable reflecting coating 133, which in this embodiment, comprises the programmable wavelength selective reflection layer 142 and the black absorber layer 143, covering the back portions of the spherical lens 132 that are not attached to the waveguide core 252. The programmable wavelength selective reflection layer 142 is disposed closest to the spherical lenses 132 and adjacent to the cladding 253. The black absorber layer 143 is disposed on the backside of the programmable wavelength selective reflection layer 142.

Some of the programming light beam 121, which propagates down the waveguide 251, passes through a given spherical lens onto the next lens and some of that light is deflected (by total internal reflection from the curved lens/spacer interface) toward the programmable wavelength selective reflection layer 142 on the back side of the strip 250. Furthermore, some of the programming light 121 is deflected toward the front side of the strip 250, which could serve as an undesirable loss mechanism for the programming light 121. A broadband reflection filter 257 that reflects the programming light wavelength may be added on the front side, and disposed on the outside of the spacer/cladding 253, to selectively reflect the programming light 121 back into the lenses 132. In another embodiment, another broadband reflection filter 257 for the programming light 121 may be added between the wavelength selective reflection layer 142 (which contains the photochromic material) and the black absorber layer 143. Therefore, more of the programming light 121 that is captured by a given lens region (instead of propagating through that region) will be utilized to program the photochromic material.

Optical Identification System and Method Description

FIG. 1 shows a preferred embodiment of the Optical Identification System and Method invention. The Optical Identification System and Method invention comprises an optical label 101, an optical interrogator 102 and a programmer 15, as shown in FIG. 2. Referring to FIG. 1, the optical label comprises a collection of reflecting constructs 103 whose reflection can be programmed by the programmer 15, as shown in FIG. 2. Methods to combine the reflecting constructs 103 into an optical label are known to a person with ordinary skill in the art. Embodiments of the Optical Identification System and Method invention show that the optical label may be constructed as a fabric comprising many of the constructs 103 in the form of strands of yarn, woven or knitted into the fabric.

Furthermore, an optical label 101 may comprise several different kinds of the reflecting constructs 103, wherein each kind of the constructs 103 is associated with a particular wavelength of a wavelength code carried by the label 101 and capable of reflecting that particular wavelength of an interrogating light beam 105. In particular, each reflecting construct 103 may be programmed to reflect or not reflect its associated wavelength. Therefore, the collection of constructs 103 on the label 101 can be programmed to reflect a certain pattern of wavelengths, according to a wavelength-code associated with the label.

In FIG. 1, the optical interrogator 102 illuminates the label 101 with an exemplary interrogating light beam 105 that comprises multiple wavelengths of light ($\lambda E1$, $\lambda E2$, $\lambda E3$, $\lambda E4$). The label 101 reflects selected exemplary wavelengths 106 $\lambda E1$ and $\lambda E4$ that correspond to the code with which the label 101 has been programmed. If reflectance equals binary 1, absorbance equals binary 0 and $\lambda E4$ is the most significant bit, then the reflected code is equivalent to 1001.

FIG. 2 illustrates an exemplary coding process. The programmer 15 illuminates the optical label 101 when the label is being programmed to carry a particular wavelength code. The label 101 can be programmed and reprogrammed with various wavelength codes. A programming light beam 121 comprising specific programming wavelengths of light (e.g., $\lambda A1$, $\lambda B2$, $\lambda B3$, $\lambda A4$ and $\lambda C$) illuminates the label 101. $\lambda C$ is a gating signal that enables programming by $\lambda A$ and $\lambda B$. Each reflecting construct 103 of the label 101 comprises photochromic material that can be in either a first state or a second state. The specific combination of wavelengths of the programming light beam 121 sets and changes the states of the photochromic materials contained in the collection of reflecting constructs 103 of the label 101. The programming light is then removed and the photochromic materials retain their states.

Referring back to FIG. 1, the states of the photochromic materials can be interrogated by an interrogating light beam 105. Different reflecting construct 103 in the label 101 may be programmed differently by the programming light beam 121. In this exemplary embodiment, each of the reflecting constructs 103 selectively accepts only certain programming wavelengths (e.g., $\lambda A1$, $\lambda B1$, and $\lambda C$) and rejects the other programming wavelengths. Each construct 103 may be programmed to reflect, or not reflect a particular $\lambda E$. Since these different constructs 103 can be associated with different wavelengths of the interrogating light, a wavelength code can be programmed into the response produced by a collection of the constructs 103 of the label 101.

Furthermore, both the interrogation and programming processes can be done with the interrogator 102 and programmer 15 located at a distance, without physical contact to the label 101, since they are done with beams of light. The interrogator 102 and the programmer 15 do not have to be in contact with nor in physical proximity to the label 101 being interrogated or programmed. Instead, the standoff distance between the interrogator 102/programmer 15 and the label 101 is determined primarily by the optical signal intensity that is needed to effectively accomplish the programming and the sensing of the wavelength code. Standoff distances of fractions of a meter to many tens or hundreds of meters may be possible, with the distances typically larger for interrogation than for programming.

The photochromic material in the programmable wavelength selective reflection filter 142 of the programmable reflecting structure 103 can be responsive to a large range of wavelengths. A narrow band filter response can be realized by incorporating that photochromic material into an optical interference filter structure. The filter spectrum of that structure changes as the state of the photochromic material is changed by the programming light beam 121 as shown in FIG. 5. Furthermore, the reflecting construct 103 may be illuminated by a large range of wavelengths, with only some of the wavelengths associated with that particular construct 103. The multi-peak transmission filter 141 of the first part selects the specific programming wavelengths for a particular reflecting construct 103. The use of different transmission filters 141 in the first parts of different reflecting constructs 103 distinguishes the constructs. In this way some constructs 103 may be programmed to be either reflecting or non-reflecting for one wavelength and other constructs 103 may be programmed to be either reflecting or non-reflecting for a different wavelength.

One exemplary type of wavelength code of this invention may be a binary code wherein each wavelength represents a bit of the code. Each bit has a logical 1 value (reflecting construct 103) or a logical 0 value (non-reflecting construct 103). For improved code detection, the code words of 00 . . . 00 and 11 . . . 11 may be excluded. Thus, a 3 wavelength code can have 6 different code words; a 5 wavelength code can have 30 different code words. A 9 wavelength code can have 510 different code words.

FIG. 19 shows an exemplary embodiment of the optical programmer 15. The programmer 15 generates light beam 121 comprising various programming wavelengths of the optical label 101 as shown in FIG. 2. The programmer 15 contains a number of light sources 35, such as lasers, light-emitting diodes (LEDs) and flash lamps that emit the various programming wavelengths. These light sources 35 may be grouped into three sets. One set includes the sources 35 that produce the UV and blue wavelengths. A second set includes the sources 35 that produce the yellow to near IR wavelengths. A third set (e.g. 33) includes the longer IR wavelengths, generally 1300 nm or greater. A flash lamp can produce light at the wavelengths of all three sets. The flash lamp can be used in combination with optical multi-peak transmission filters 141 that select the specific programming wavelengths. One or more multi-peak transmission filters 141 would have their transmission peaks centered at each of the programming wavelengths. These multi-peak transmission filters 141 preferably have passband widths that match the bandwidths of the programmable wavelength selective reflection filter 142 of the programmable reflecting structure 103 as shown in FIGS. 4 and 5.

Laser diodes and LEDs can produce light in these wavelength ranges discussed above. The laser diodes and LEDs offer a compact and potentially energy efficient means to generate the programming light beam 121. The wavelengths of the LEDs that have been demonstrated already cover the entire range of the programming wavelengths. For example, LEDs have produced light at UV wavelengths ranging from 250 nm to 340 nm. See M. A. Khan, "Deep ultraviolet LEDs fabricated in AlInGaN using MEMOCVD," SPIE Proceedings, vol. 5530 (2004), pp. 224-230; and J. Han and A. V. Nurmikko, "Advances in AlGaInN blue and ultraviolet light emitters, IEEE Journal on Selected Topics in Quantum Electronics, vol. 8, n. 2 (2002), pp. 289-297, herein incorporated by reference. Other LEDs can emit at blue to blue-green wavelengths. See S. Nagahama, Y. Sugimoto, T. Kozaki and T. Mukai, "Recent progress of AlInGaN laser diodes," SPIE Proceedings, vol. 5738 (2005), pp. 57-62, herein incorporated by reference. Furthermore, LEDs that emit at green, yellow, orange and red wavelengths also have been demonstrated. See R. S. Kern, "Progress and status of visible light emitting diode technology," SPIE Proceedings, vol. 3621 (1999), pp. 16-27, herein incorporated by reference. In fact, LEDs that emit multi-color white light also have been demonstrated. See S. W. S. Chi, et al., "Multi-color white light emitting diodes for illumination applications," SPIE Proceedings, vol. 5187 (2004), pp. 161-170, herein incorporated by reference.

The emission spectrum of some of these LEDs discussed above may be broader than the spacing between the various programming wavelengths. In that case, optical transmission filters 25 may be used to limit the spectral width of the light produced at each programming wavelength. One or more of these optical multi-peak transmission filters 25 can be placed at the output of the LED. Note that a multi-color white LED could be used in a manner similar to flash lamp, with different filters selecting different programming wavelengths from the emission spectrum of the LED.

Lasers have been demonstrated at many of the programming wavelengths. A laser typically has a much narrower emission spectrum than a LED. Thus, a transmission filter 25 likely would not be needed for the laser output. Also, many lasers can produce very high output powers. In particular, both high power lasers and high power LEDs have been demonstrated at the wavelength range of 1300-1800 nm.

In FIG. 19, a code selector 37, typically an electronic circuit that provides drive power to the LEDs or lasers, can be used to select the specific combination of programming wavelengths desired. The optical outputs from the various light sources 33, 35 (and wavelength selection filters 25) are combined together with an optical beam combiner 39. This beam combiner 39 may comprise a diffractive element (such as a grating) or some other known means for combining multiple beams of light into an output beam. The programmer 15 also may include some means, such as mirrors, to steer the output programming light beam 121, whereby the beam 121 is directed toward particular spots on the labeled surface.

FIG. 20 shows an exemplary embodiment of an optical interrogator 102 as shown in FIG. 1. The optical interrogator 102 typically comprises a laser transmitter 41, a receiver 43 and some telescope optics 55. The laser transmitter 41 can comprise multiple laser sources 45, with each laser source 45 emitting at a different interrogation wavelength. The outputs of these laser sources 45 may be combined together by a beam combiner 39 such as an optical coupler or wavelength multiplexer. An optical fiber 47 (optional) may be used to couple the laser light to the telescope optics 55. The telescope optics 55 forms the output beam 105 that is directed toward an optical label 101 as shown in FIG. 1. The same or different telescope optics 55 also is used with the receiver 43. The telescope optics 55 coupled to the receiver 43 receives a reflected light 106 from a label 101 as shown in FIG. 1. An optional optical fiber 47 may be used to couple the telescope optics 55 to an optical wavelength de-multiplexer 49 (or, alternatively, an optical power splitter). The de-multiplexer 49 separates the various wavelength components of the received light. The various wavelength components are then coupled into a plurality of photodetectors 51, with one photodetector 51 associated with each wavelength (i.e., each code bit). The photodetectors 51 produce electrical signals that correspond to the intensity of the light at each of the received wavelengths. These intensities represent the wavelength coded response from the label 101.

A decoding processor 53 compares these photodetector signals with each other and with set point values to determine the code that has been returned by the label 101. In general, the photodetected signal associated with each interrogation wavelength is noisy. There can be noise associated with either a "1" received signal or a "0" received signal. The "1" received signal may have noise because of the uncertainty in the amount of reflecting material on the label that has been illuminated by the interrogating light beam 105 and in the clarity of the optical path between the interrogator 102 and the label 101. Additional noise in a "1" signal also could be contributed by conditions such as atmospheric turbulence or scattering particles (e.g., fog or dust) in the optic path between the interrogator 102 and the label 101.

Noise in a "0" signal typically is contributed by electronic components in the receiver 43. Noise in a "0" signal also could be contributed by unwanted scattering or reflection of the interrogating light beam 105 by other regions of the labeled object (or even by the label 101 itself). The wavelength code words preferably comprise a combination of "1" and "0" values. The specific wavelength code words of "00 . . . 0" and "11 . . . 1" are excluded. This exclusion makes the decoding process less sensitive to attenuation or broadband scattering brought about by transmission through the path between the interrogator 102 and the label 101. Decision points or values (which could be different for signals associated with different interrogation wavelengths) may be established that result in a desired probability of correct code word determination.

From the foregoing description, it will be apparent that the present invention has a number of advantages, some of which have been described herein, and others of which are inherent in the embodiments of the invention described or claimed herein. Also, it will be understood that modifications can be made to the device and method described herein without departing from the teachings of subject matter described herein. As such, the invention is not to be limited to the described embodiments except as required by the appended claims.

What is claimed is:

1. An optical identification system comprising:
   an optical interrogator for interrogating an optically programmable electrically passive optical label by an interrogating light beam;
   wherein said interrogating light beam comprises a plurality of wavelengths;
   wherein the optical label comprises a plurality of retro-reflecting constructs;
   wherein the optical label reflects a subset of said wavelengths of the interrogating light beam and minimally reflects the remaining wavelengths of the interrogating light beam; and
   wherein the reflected and minimally reflected wavelengths comprise a wavelength code.

2. The optical identification system of claim 1 wherein said optical interrogator comprises an optical transmitter and an optical receiver coupled to a decoder, wherein said optical transmitter emits said interrogating light beam to illuminate said optical label,
   said optical label reflects said interrogating light beam to said optical receiver coupled to said decoder,
   said decoder decodes said wavelength code to identify said optical label.

3. The optical identification system of claim 2 wherein said optical label comprises a plurality of retro-reflecting constructs, each retro-reflecting construct of said retro-reflecting constructs is configured to reflect at least one wavelength of the interrogating light beam.

4. The optical identification system of claim 1 wherein at least one retro-reflecting construct of said retro-reflecting constructs being responsive to a specific subset of wavelengths of a programming light beam and non-responsive to the other wavelengths of the programming light beam.

5. The optical identification system of claim 4 wherein a retro-reflecting construct of said plurality of retro-reflecting construct can have a reflecting state and a non-reflecting state, wherein said retro-reflecting construct can be programmed to said reflecting state by illuminating said retro-reflecting construct with a first wavelength of the programming light beam and can be programmed to said non-reflecting state by illuminating said retro-reflecting construct with a second wavelength of said programming light beam.

6. The optical identification system of claim 5 therein said retro-reflecting construct further comprises a multi-peak transmission filter, said multi-peak transmission filter transmitting said first wavelength and said second wavelength of the programming light beam and not transmitting other wavelengths of said programming light beam.

7. The optical identification system of claim 1 wherein at least one of said retro-reflecting constructs comprising a retro-reflecting optical member and a multi-part programmable reflecting structure, whereby said multi-part programmable reflecting structure is programmed by said programming light beam to reflect a selected combination of wavelengths of said interrogating light beam.

8. The optical identification system of claim 1 wherein said optical label can be spaced apart from said optical interrogator by a distance of at least fractions of a meter and as much as many iris or hundreds of meters.

9. The optical identification system of claim 1 further comprising an optical label programmer wherein said optical label can be spaced apart from said programmer by a distance of at least fractions of a meter and as much as many hundreds of meters.

10. A method of identifying items comprising the steps of:
    illuminating an optically programmable electrically passive optical label affixed to an item with an interrogating light beam, said interrogating light beam comprising at least two wavelengths;
    wherein the optical label comprises a plurality of retro-reflecting constructs;
    wherein said optical label reflects a subset of said wavelengths of the interrogating light beam and minimally reflects the remaining wavelengths of the interrogating light beam;
    decoding said reflected and minimally reflected wavelengths to identify said optical label.

11. The method of identifying items of claim 10 wherein said reflected and minimally reflected wavelengths comprise a spectral code.

12. The method of claim 11 further comprising the step of absorbing said remaining wavelengths of said interrogating light beam.

13. The method of identifying items of claim 11 further comprising the step of detecting said light reflected from said optical label.

14. A method of programming an optically programmable electrically passive retro-reflective optical label comprising the steps of: illuminating said optically programmable electrically passive optical label with a programming light beam, wherein said programming light beam comprises at least three wavelengths; wherein said optical label comprises a plurality of retro-reflecting constructs.

15. The method of programming an optical label of claim 14 further comprising the step of filtering said programming light beam to transmit a subset of said at least three wavelengths programming light and to not transmit the remaining wavelengths of said programming light.

16. The method of programming an optical label of claim 14 wherein said optical label can be in one state among at least two states of reflection, said method further comprising the step of changing the state of reflection of said optical label from one state to another state of said at least two states of reflection in response to said programming light.

17. The method of programming an optical label of claim 14 wherein at least one of said plurality of retro-reflecting constructs comprise a retro-reflecting optical member and a multi-part programmable reflecting structure, whereby said optical label is programmed by said programming light beam to retro-reflect a selected combination of wavelengths of said interrogating light beam.

* * * * *